(12) United States Patent
Wan et al.

(10) Patent No.: US 10,324,616 B2
(45) Date of Patent: Jun. 18, 2019

(54) INFORMATION PROCESSING METHOD AND ELECTRONIC APPARATUS

(71) Applicant: Lenovo (Beijing) Co., Ltd., Beijing (CN)

(72) Inventors: Xi Wan, Beijing (CN); Xu Zhao, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 14 days.

(21) Appl. No.: 14/584,688

(22) Filed: Dec. 29, 2014

(65) Prior Publication Data

US 2015/0378548 A1    Dec. 31, 2015

(30) Foreign Application Priority Data

Jun. 25, 2014  (CN) .......................... 2014 1 0292977

(51) Int. Cl.
*G06F 3/0488*  (2013.01)
*G06F 1/16*  (2006.01)

(52) U.S. Cl.
CPC .......... *G06F 3/04883* (2013.01); *G06F 1/163* (2013.01); *G06F 1/1643* (2013.01); *G06F 2203/04808* (2013.01)

(58) Field of Classification Search
CPC ....... G04G 21/08; G06F 1/1626; G06F 1/163; G06F 1/1643; G06F 1/169;

(Continued)

(56) References Cited

U.S. PATENT DOCUMENTS 8,725,842 B1    5/2014 Al-Nasser
2010/0219943 A1    9/2010 Vanska et al.
(Continued)

FOREIGN PATENT DOCUMENTS

| CN | 102654815 | 9/2012 |
| CN | 103677131 | 3/2014 |
| CN | 103870042 | 6/2014 |

OTHER PUBLICATIONS

Office Action, and English language translation thereof, in corresponding German Application No. 102014019648.8, dated Aug. 14, 2017, 13 pages.

(Continued)

*Primary Examiner* — Kenneth Bukowski
(74) *Attorney, Agent, or Firm* — Brinks Gilson & Lione; John C. Freeman

(57) ABSTRACT

An information processing method and an electronic apparatus are described. The method includes acquiring M sense points for representing an input operation through a sensing device; deciding whether the M sense points satisfy a predetermined condition to generate a decision result; when the decision result identifies that the M sense points satisfy the predetermined condition, representing that the input operation is an input operation for changing the display content of a display screen, and then generating a switch instruction; controlling a first object identification in the first region of the display screen to change to a N+1th object identification at a first moment in response to the switch instruction according to parameter values of the M sense points; controlling a second region including the first region of the display screen to display N+1th data content corresponding to the N+1th object identification one by one at a T+1th moment.

10 Claims, 24 Drawing Sheets

(58) Field of Classification Search
CPC .............. G06F 3/04855; G06F 3/0488; G06F 2203/04806; G06F 3/04845; H04M 1/72583
See application file for complete search history.

(56) References Cited

U.S. PATENT DOCUMENTS

2011/0157046 A1* 6/2011 Lee ..................... G04G 21/08
345/173
2016/0291638 A1 10/2016 Fu

OTHER PUBLICATIONS

First Office Action (15 pages including English translation) dated Oct. 30, 2017 from Chinese priority Application No. 201410292977.5.

* cited by examiner

INFORMATION PROCESSING METHOD AND ELECTRONIC APPARATUS

This application claims priority to Chinese patent application No. 201410292977.5 filed on Jun. 25, 2014, the entire contents of which are incorporated herein by reference.

BACKGROUND

The present disclosure relates to field of electronic technology, and particularly relates to an information processing method and an electronic apparatus.

A wearable electronic apparatus such as a multi-function smart watch including a touch screen has appeared on market. Generally, the smart watch only has one display interface on which various information is exhibited, such as time, data, temperature, and so on. However, the smart watch can't be divided into a plurality of regions physically to display different types of information at present, and since the display interface is relatively small, information can't be obtained accurately and efficiently.

SUMMARY

An information processing method applied in an electronic apparatus comprising a display screen and a sensing device, the method comprising: acquiring M sense points for representing an input operation through the sensing device, wherein M is an integer larger than or equal to 1; deciding whether the M sense points satisfy a predetermined condition to generate a decision result; representing that the input operation is an input operation for changing the display content of the display screen when the decision result identifies that the M sense points satisfy the predetermined condition, and generating a switch instruction; controlling a first object identification in a first region of the display screen to change to a N+1th object identification at a first moment in response to the switch instruction according to the parameter values of the M sense points, wherein N is an integer larger than or equal to 1; and controlling a second region including the first region of the display screen to display N+1th data content corresponding to the N+1th object identification one by one at a T+1th moment, wherein T is an integer larger than or equal to 1.

BRIEF DESCRIPTION OF THE DRAWINGS

FIG. 1-2 to FIG. 1-4 are first group of schematic diagrams of a scene corresponding to the first embodiment of the present disclosure.

FIG. 1-5 to FIG. 1-7 are second group of schematic diagrams of the scene corresponding to the first embodiment of the present disclosure.

FIG. 1-8 to FIG. 1-10 are third group of schematic diagrams of the scene corresponding to the first embodiment of the present disclosure.

FIG. 2-1 is a schematic diagram of the information processing method of the second embodiment of the present disclosure.

FIG. 2-2 to FIG. 2-4 are first group of schematic diagrams of a scene corresponding to the second embodiment of the present disclosure.

FIG. 3-1 is a schematic diagram of the information processing method of the third embodiment of the present disclosure.

FIG. 3-2 to FIG. 3-3 are first group of schematic diagrams of a scene corresponding to the third embodiments of the present disclosure.

FIG. 3-4 to FIG. 3-10 are second group of schematic diagrams of the scene corresponding to the third embodiments of the present disclosure.

FIG. 4 is a schematic diagram of the information processing method of the fourth embodiment of the present disclosure.

FIG. 5-1 is a schematic diagram of the information processing method of the fifth embodiment of the present disclosure.

FIG. 5-2 is a schematic diagram of the display region on the display screen of the fifth embodiment of the present disclosure.

FIG. 6-1 is a first schematic diagram of the electronic apparatus of the sixth embodiment of the present disclosure.

FIG. 6-2 is a side view of the electronic apparatus of the sixth embodiment of the present disclosure.

FIG. 6-3 is a second schematic diagram of the electronic apparatus of the sixth embodiment of the present disclosure.

FIG. 6-4 is a first schematic diagram of a scene corresponding to the sixth embodiment of the present disclosure.

FIG. 6-5 is a schematic diagram of the information processing method of the sixth embodiment of the present disclosure.

FIG. 7 is a schematic diagram of the electronic apparatus of the seventh embodiment of the present disclosure.

FIG. 8 is a schematic diagram of the electronic apparatus of the eighth embodiment of the present disclosure.

FIG. 9 is a schematic diagram of the electronic apparatus of the ninth embodiment of the present disclosure.

FIG. 10 is a schematic diagram of the electronic apparatus of the tenth embodiment of the present disclosure.

DETAILED DESCRIPTION

In the following respective embodiments of the present disclosure, the electronic apparatus may be a smart wearable electronic apparatus such as a smart watch, a smart bracelet or the like. This kind of smart electronic apparatus has various functions, for example, has functions of ordinary watch, and further has video and audio function, function of monitoring heart rate, temperature, blood pressure or the like of the user, and function of detecting temperature, humidity or the like of an external environment. These functions are generally implemented by installing applications (hereafter referred to as applications simply) other than support of hardware, thus, the electronic apparatus usually has installed some dozens or even hundreds of applications when in use, and the applications may be installed in advance at a manufacture as shipping, or may be installed by the user himself from an application store, and so on. Each application has a display object, and the display object of the application includes an object identification and data content, and the data content may be some explain text of the object identification.

The electronic apparatus has a feature of relatively small display interface other than the above-described features, and an interactive mode of the electronic apparatus with the user or the like adopts a touch control mode generally, and a touch control of the electronic apparatus by the user or the like is inputted through a finger, a touch control pen or the like. Since the display interface is relatively small, and the number of the display objects that needs to be displayed by the electronic apparatus is relatively large, and also since content to be displayed of each display object is relatively much, the user can't obtain information accurately no matter the user uses the finger to interact with the electronic apparatus or uses the touch control pen to interact with the electronic apparatus, which results in a low efficiency of use. For example, when the user wants to turn on a function of listening to music of the electronic apparatus, the function of listening to music corresponds to an application, e.g., an application G, then how can the user find the application G needed by himself from some dozen or even hundreds of applications quickly and accurately; when the user wants to browse the applications of the electronic apparatus quickly, how to facilitate usage of the user on such a small display interface. The technical solutions provided by the following embodiments of the present disclosure improve the user experience when the user uses the electronic apparatus having a small screen.

The technical solutions of the present disclosure are further described detailed in combination with the accompanying drawings and the specific embodiment.

First embodiment

Figure 1:
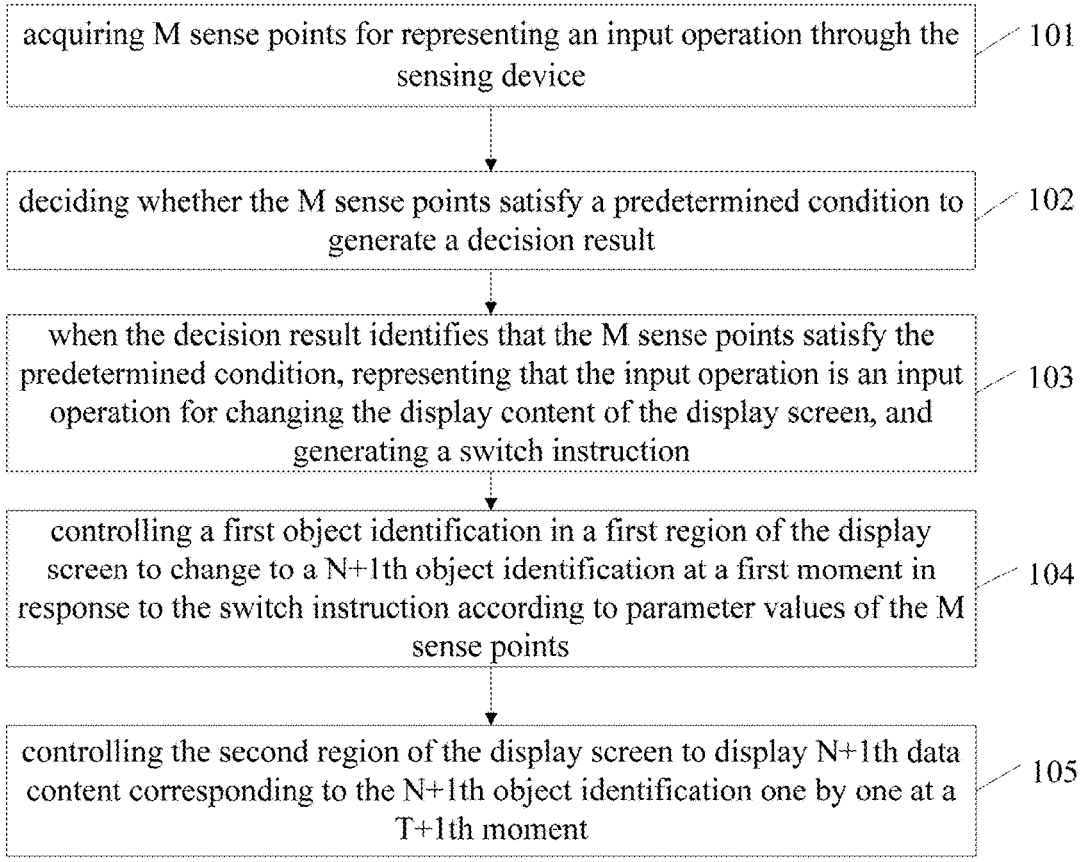
FIG. 1-1 is a schematic diagram of the information processing method of the first embodiment of the present disclosure.

The embodiments of the present disclosure provide an information processing method applied in an electronic apparatus including a display screen and a sensing device, FIG. 1-1 is a schematic diagram of a flow of implementation of the information processing method of the first embodiment of the present disclosure, and as shown in FIG. 1-1, the method includes:

Step 101: acquiring M sense points for representing an input operation through the sensing device.

Here, M is an integer larger than or equal to 1, and the display screen and the sensing device may be an integrated device, that is, the integrated device may have a display function of the display screen and a sensing function of the sensing device, and in a specific implementation procedure, the integrated device may be a touch control display screen, and the touch control display screen includes a touch control display screen of capacitive type, a touch control display screen of resistive type, and a touch control display screen of inductive type, and so on. When the sensing device is the touch control display screen, correspondingly, the sense points are touch control points on the touch control display screen.

Step 102: deciding whether the M sense points satisfy a predetermined condition to generate a decision result.

Here, the predetermined condition is a preset condition representing changing display content of the display screen.

Step 103: when the decision result identifies that the M sense points satisfy the predetermined condition, representing that the input operation is an input operation for changing the display content of the display screen, and generating a switch instruction.

Step 104: controlling a first object identification in a first region of the display screen to change to a N+1th object identification at a first moment in response to the switch instruction according to parameter values of the M sense points.

Here, N is an integer larger than or equal to 1. The parameter values may be a degree of force applied by the user sensed by the sensing device or acceleration sensed by the sensing device or the like when the user carries out the input operation. The switch instruction corresponds to magnitudes of the parameter values. The object identification may include at least one of the following information of the display object: icon, text, number. The first region is a part of the display region of the display screen.

Step 105: controlling the second region of the display screen to display N+1th data content corresponding to the N+1th object identification one by one at a T+1th moment.

Here, the second region includes the first region, and T is an integer larger than or equal to 1. The second region may be all of the display region of the display screen, of course, it may also be a part of the display region of the display screen.

As shown in FIG. 1-2 to FIG. 1-4, for example, the electronic apparatus is the smart watch, and a dial plate of the smart watch may be a circular shape or a rectangle shape or the like. The display region of the electronic apparatus is the second region 12, and the second region 12 includes the first region 11. in FIG. 1-2 and FIG. 1-3, in order to display magnitude relation between the first region 11 and the second region 12 clearly, the first region 11 is identified with dotted line box, and in specific implementation procedure, the first region 11 does not have the dotted line box.

Figures 1, 2:
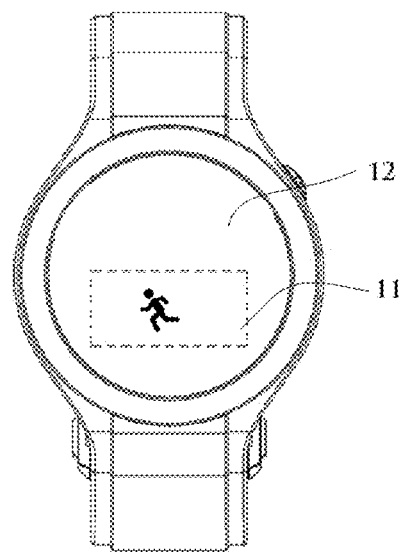
Figures 1, 2, 3:
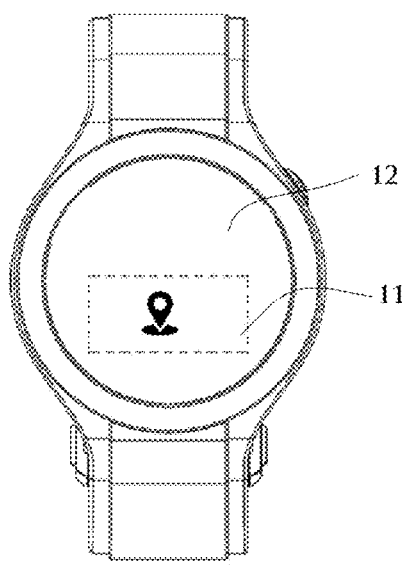

The technical solution provided by the embodiments of the present disclosure may be used in the following scenes, for example, the user is running, and the electronic apparatus displays a first object identification as shown in FIG. 1-2 at this time. When the user wants to see if there is any shop nearby when he runs to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. The first object identification in the first region 11 of the display screen changes to the N+1th object identification as shown in FIG. 1-3 at the first moment in response to the switch instruction according to the parameter values of the M sense points. At the T+1th moment, as shown in FIG. 1-4, the electronic apparatus controls the second region of the display screen to display the N+1th data content corresponding to the N+1th object identification as shown in FIG. 1-3 one by one.

The technical solution provided by the embodiments of the present disclosure may also be used in the following scenes, for example, the user is running, and the electronic apparatus display a first object identification as shown in FIG. 1-8 at this time. When the user wants to see if there is any shop nearby when he runs to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. The first object identification in the first region 11 of the display screen changes to the N+1th object identification as shown in FIG. 1-9 at the first moment in response to the switch instruction according to the parameter values of the M sense points. At the T+1th moment, as shown in FIG. 1-10, the electronic apparatus controls the second region of the display screen to display the N+1th data content corresponding to the N+1th object identification as shown in FIG. 1-9 one by one.

Second embodiment

Based on the above-described first embodiment, the embodiments of the present disclosure provide an information processing method applied in an electronic apparatus including a display screen and a sensing device, FIG. 2-1 is a schematic diagram of a flow of implementation of the information processing method of the second embodiment of the present disclosure, and as shown in FIG. 2-1, the method includes:

Step 201: acquiring M sense points for representing an input operation through the sensing device.

Here, M is an integer larger than or equal to 1, and the display screen and the sensing device may be an integrated device, that is, the integrated device may have a display function of the display screen and a sensing function of the sensing device, and in a specific implementation procedure, the integrated device may be a touch control display screen, and the touch control display screen includes a touch control display screen of capacitive type, a touch control display screen of resistive type, and a touch control display screen of inductive type, and so on. When the sensing device is the touch control display screen, correspondingly, the sense points are touch control points on the touch control display screen.

Step 202: deciding whether the M sense points satisfy a predetermined condition to generate a decision result.

Here, the predetermined condition is a preset condition representing changing display content of the display screen.

Step 203: when the decision result identifies that the M sense points satisfy the predetermined condition, representing that the input operation is an input operation for changing the display content of the display screen, and generating a switch instruction.

Step 204: controlling to display n object identifications in order in the first region of the display screen during the first moment to the N+1th moment in response to the switch instruction when the parameter values of the M sense points are larger than a set threshold.

Wherein, a last object identification of the n object identifications are the N+1th object identification, $2 \leq n \leq N$, and N is an integer larger than or equal to 1.

Here, the parameter values may be a degree of force applied by the user sensed by the sensing device or acceleration sensed by the sensing device or the like when the user carries out the input operation. The object identification may include at least one of the following information of the display object: icon, text, number.

Step 205: acquiring M sense points for representing an input operation through the sensing device.

Here, M is an integer larger than or equal to 1.

Step 206: deciding whether the M sense points satisfy a first predetermined condition to generate a first decision result.

Step 207: when the first decision result identifies that the M sense points satisfy the first predetermined condition, representing that the input operation is an input operation for stopping the display content of the display screen, and generating a stop instruction.

Step 208: controlling the second region of the display screen to display the N+1th data content corresponding to the N+1th object identification one by one in response to the stop instruction at the T+1th moment.

Here, the second region includes the first region, and T is an integer larger than or equal to 1, and the T+1th moment is after the N+1th moment.

Figures 1, 2, 3, 4:

The technical solution provided by the embodiments of the present disclosure may be used in the following scenes, for example, the user is running, and the electronic apparatus display a first object identification as shown in FIG. 2-2 at this time. When the user wants to see if there is any shop nearby when he runs to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. N object identifications are controlled to be displayed in order in the first region of the display screen during the first moment to the N+1th moment in response to the switch instruction when the parameter values of the M sense points are larger than a set threshold. As shown in FIG. 2-3, at the time of displaying the N+1th object identification, the user see that the N+1th object identification is the object identification needed by the user, that is, the N+1th object identification is an object identification of an application for representing which shop is nearby, and then, the user carries out the first input operation to the electronic apparatus, and the electronic apparatus acquires the M sense points through the sensing device and decides whether the M sense points satisfy the first predetermined condition to generate the first decision result. When the first decision result identifies that the M sense points satisfy the first predetermined condition, it represents that the input operation is the input operation for stopping the display content of the display screen, and generating the stop instruction. As shown in FIG. 2-4, the second region of the display screen is controlled to display the N+1th data content corresponding to the N+1th object identification one by one in response to the stop instruction at the T+1th moment.

In the embodiment of the present disclosure, the electronic apparatus detects whether the parameter values of the M sense points are larger than the set threshold, and carries out fast switch of the object identifications corresponding to the applications when the parameter values of the sense points are larger than the set threshold, thus time of the user can be saved, and when the user see the object identification needed by himself, he can view carefully by inputting a stop operation. Thus, the technical solution provided by the embodiment of the present disclosure can make the user to position the information needed by himself quickly and accurately, so as to improve the efficiency of use and in turn improve the user experience.

Third embodiment

Based on the above-described first embodiment, the embodiments of the present disclosure provide an information processing method applied in an electronic apparatus including a display screen and a sensing device, FIG. 3-1 is a schematic diagram of a flow of implementation of the information processing method of the third embodiment of the present disclosure, and as shown in FIG. 3-1, the method includes:

Step 301: acquiring M sense points for representing an input operation through the sensing device.

Here, M is an integer larger than or equal to 1, and the display screen and the sensing device may be an integrated device, that is, the integrated device may have a display function of the display screen and a sensing function of the sensing device, and in a specific implementation procedure, the integrated device may be a touch control display screen, and the touch control display screen includes a touch control display screen of capacitive type, a touch control display screen of resistive type, and a touch control display screen of inductive type, and so on. When the sensing device is the touch control display screen, correspondingly, the sense points are touch control points on the touch control display screen.

Step 302: deciding whether the M sense points satisfy a predetermined condition to generate a decision result.

Here, the predetermined condition is a preset condition representing changing display content of the display screen.

Step 303: when the decision result identifies that the M sense points satisfy the predetermined condition, representing that the input operation is an input operation for changing the display content of the display screen, and generating a switch instruction.

Step 304: controlling to display a second object identifications in the first region of the display screen at the first moment in response to the switch instruction when the parameter values of the M sense points are less than a set threshold.

Wherein, the second object identification is the N+1th object identification. The second object identification is a next object identification of the first object identification, and N is an integer larger than or equal to 1.

Here, the parameter values may be a degree of force applied by the user sensed by the sensing device or acceleration sensed by the sensing device or the like when the user carries out the input operation. The switch instruction corresponds to magnitudes of the parameter values. The object identification may include at least one of the following information of the display object: icon, text, number.

Step 305: controlling the second region of the display screen to display second data content corresponding to the second object identification one by one at a second moment when the sense points are not acquired through the sensing device in a predetermined time period.

Here, the second region includes the first region.

The technical solution provided by the embodiments of the present disclosure may be used in the following scenes, for example, the user is running, and the electronic apparatus display a first object identification as shown in FIG. 2-2 at this time. When the user wants to have a rest when he run to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. When the parameter values of the M sense points are less than a set threshold, a second object identification as shown in FIG. 3-2 is controlled to be displayed in the first region of the display screen at the first moment in response to the switch instruction, and the second object identification is an object identification of an application of music player. And then, when the sense points are not acquired through the sensing device in the predetermined time period, that is, when the user does not operate the electronic apparatus in the predetermined time period, as shown in FIG. 3-3, the second region 12 of the display screen is controlled to display the second data content corresponding to the second object identification one by one at the second moment.

In the second embodiment and the third embodiment of the present disclosure, the content displayed by the display screen relates to a display procedure from the object identification to the data content, in particular, steps related to the display procedure in the second embodiment include step 204 and step 208, and steps related to the display procedure in the third embodiment include step 304 and step 305. The embodiments of the present disclosure provide a manner of displaying result in the above second and third embodiment. Taking step 304 and step 305 in the third embodiment as example, the electronic apparatus controls to display the second object identification as shown in FIG. 1-3 in the first region of the display screen at the first moment, and here, the second object identification is an identification for searching a shop nearby. And then when sense points are not acquired through the sensing device in the predetermined time period, that is, when the user does not operate the electronic apparatus in the predetermined time period, as shown in FIG. 1-5 to FIG. 1-7, the second object identification moves out the second region slowly, and the data content corresponding to the second object identification enters the second region slowly, and only the data content corresponding to the second object identification is left at last, as shown in FIG. 1-4. It can be seen that from above, the second object identification is moved out from bottom to top in FIG. 1-5 to FIG. 1-7.

Figures 1, 2, 3, 4, 5:
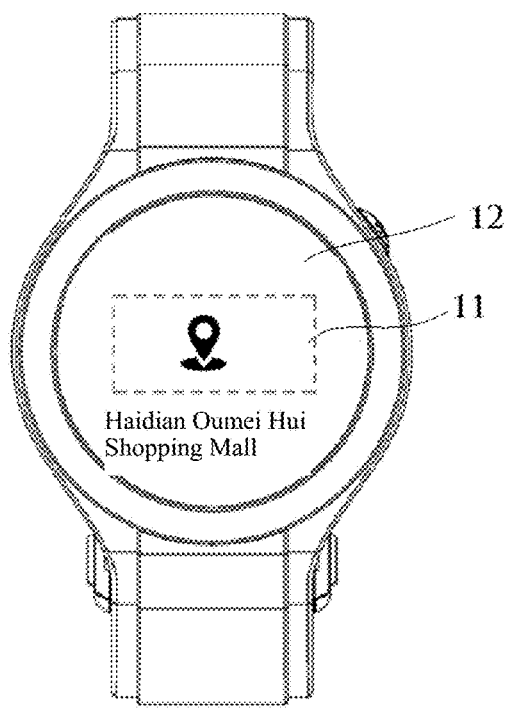

The technical solution provided by the embodiments of the present disclosure may also be used in the following scenes, for example, the user is running, and the electronic apparatus display a first object identification as shown in FIG. 3-4 at this time. When the user wants to see if there is any shop nearby when he runs to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. When the parameter values of the M sense points are less than a set threshold, the first object identification in the first region 11 of the display screen is controlled to change to the second object identification as shown in FIG. 3-5 at the first moment in response to the switch instruction. Here, the second object identification is the identification for searching the shop nearby. And then when sense points are not acquired through the sensing device in the predetermined time period, that is, when the user does not operate the electronic apparatus in the predetermined time period, as shown in FIG. 3-6 and FIG. 3-7, the second object identification moves out the second region slowly, and the data content corresponding to the second object identification enters the second region slowly, and only the data content corresponding to the second object identification is left at last, as shown in FIG. 3-8.

It needs to explain that, changing from the first object identification as shown in FIG. 3-4 to the second object identification as shown in FIG. 3-5 is a procedure of gradual change. The procedure of gradual change may be go beyond a range that the user can perceive, thus, the user feels that the display region is change from FIG. 3-4 to FIG. 3-5 suddenly, and the procedure of gradual change may be perceived by the user, and the user also see display interfaces as shown in FIG. 3-9 and FIG. 3-10 other than display interfaces as shown in FIG. 3-4 and FIG. 3-5. In other words, the display interfaces included in the display procedure changing from FIG. 3-4 to FIG. 3-5 are the display interfaces as shown in FIG. 3-4, FIG. 3-9, FIG. 3-10 and FIG. 3-5 in this order. Further, dotted lines in FIG. 3-7 and FIG. 3-9 is for helping to understand the technical solution of the present disclosure but not an actual display effect. It can be seen that from the above description, the change from the first object identification to the second object identification is moving out from right to left, and those skilled in the art may also set as various manners of moving out from top to bottom, from left to right, and so on.

In the embodiments of the present disclosure, the electronic apparatus detects whether the parameter values of the M sense points are larger than the set threshold, and switches the object identifications corresponding to the applications slowly when the parameter values of the sense points are less than the set threshold, and displays the data content corresponding to the object identifications when the user does not make any input. Thus, the technical solution provided by the embodiments of the present disclosure make the user to be able to view specific data content of the applications by viewing the object identifications corresponding to the applications one by one, so as to improve the efficiency of use and in turn improve the user experience.

Fourth embodiment

In a basis of the embodiments as shown in FIG. 2-1 and FIG. 3-1, the embodiments of the present disclosure provide an information processing method applied in an electronic apparatus including a display screen and a sensing device. FIG. 4 is a schematic diagram of a flow of implementation of the information processing method of the fourth embodiment of the present disclosure, and as shown in FIG. 4, after step 203, the method includes:

Step 203: when the decision result identifies that the M sense points satisfy the predetermined condition, representing that the input operation is an input operation for changing the display content of the display screen, and generating a switch instruction.

Step 204: controlling to display n object identifications in order in the first region of the display screen during the first moment to the N+1th moment in response to the switch instruction when the parameter values of the M sense points are larger than a set threshold.

Wherein, a last object identification of the n object identifications are the N+1th object identification, 2≤n≤N, and N is an integer larger than or equal to 1.

Here, the parameter values may be a degree of force applied by the user sensed by the sensing device or acceleration sensed by the sensing device or the like when the user carries out the input operation. The switch instruction corresponds to magnitudes of the parameter values.

Here, the object identification may include at least one of the following information of the display object: icon, text, number.

Step 205: acquiring the M sense points for representing the input operation through the sensing device, M is an integer larger than or equal to 1.

Step 206: deciding whether the M sense points satisfy a first predetermined condition to generate a first decision result.

Step 207: when the first decision result identifies that the M sense points satisfy the first predetermined condition, representing that the input operation is an input operation for stopping the display content of the display screen, and generating a stop instruction.

Step 208: controlling the second region of the display screen to display the N+1th data content corresponding to the N+1th object identification one by one in response to the stop instruction at the T+1th moment.

Step 304: controlling to display a second object identifications in the first region of the display screen at the first moment in response to the switch instruction when the parameter values of the M sense points are less than a set threshold.

Wherein, the second object identification is the N+1th object identification. The second object identification is a next object identification of the first object identification, and N is an integer larger than or equal to 1.

Here, the parameter values may be a degree of force applied by the user sensed by the sensing device or acceleration sensed by the sensing device or the like when the user carries out the input operation. The switch instruction corresponds to magnitudes of the parameter values. The object identification may include at least one of the following information of the display object: icon, text, number.

Step 305: controlling the second region of the display screen to display second data content corresponding to the second object identification one by one at a second moment when the sense points are not acquired through the sensing device in a predetermined time period.

Here, the second region includes the first region, and T is an integer larger than or equal to 1.

In the embodiment of the present disclosure, the electronic apparatus detects whether the parameter values of the M sense points are larger than the set threshold, and carries out fast switch of the object identifications corresponding to the applications when the parameter values of the sense points are larger than the set threshold, thus time of the user can be saved, and when the user see the object identification needed by himself, he can view carefully by inputting a stop operation.

The electronic apparatus switches the object identifications corresponding to the applications slowly when the parameter values of the sense points are less than the set threshold, and displays the data content corresponding to the object identifications when the user does not make any input. Thus, the technical solution provided by the embodiments of the present disclosure make the user to be able to view specific data content of the applications by viewing the object identifications corresponding to the applications one by one, so as to improve the efficiency of use and in turn improve the user experience.

Fifth embodiment

In a basis of the embodiment as shown in FIG. 2-1, the embodiments of the present disclosure provide an information processing method applied in an electronic apparatus including a display screen and a sensing device. FIG. 5-1 is a schematic diagram of a flow of implementation of the information processing method of the fifth embodiment of the present disclosure, and as shown in FIG. 5-1, the method includes:

Step 501: acquiring M sense points for representing an input operation through the sensing device.

Here, M is an integer larger than or equal to 1, and the display screen and the sensing device may be an integrated device, that is, the integrated device may have a display function of the display screen and a sensing function of the sensing device, and in a specific implementation procedure, the integrated device may be a touch control display screen, and the touch control display screen includes a touch control display screen of capacitive type, a touch control display screen of resistive type, and a touch control display screen of inductive type, and so on. When the sensing device is the touch control display screen, correspondingly, the sense points are touch control points on the touch control display screen.

Step 502: deciding whether the M sense points satisfy a predetermined condition to generate a decision result.

Here, the predetermined condition is a preset condition representing changing display content of the display screen.

Step 503: when the decision result identifies that the M sense points satisfy the predetermined condition, representing that the input operation is an input operation for changing the display content of the display screen, and generating a switch instruction.

Step 504: controlling n object identification to be displayed in order in the first region of the display screen during the first moment to the N+1th moment in response to the switch instruction when parameter values of the M sense points are larger than a set threshold, and controlling to display a progress identification in a third region of display screen, and controlling the progress identification to change with the sequential change of the n object identifications in the first region.

Wherein, a last object identification of the n object identifications are the N+1th object identification, 2≤n≤N, and N is an integer larger than or equal to 1. The progress identification is for indicating a positional relationship/progress relationship of the object identification positioned in the first region currently with respect to a complete set of the object identifications.

Here, the parameter values may be a degree of force applied by the user sensed by the sensing device or acceleration sensed by the sensing device or the like when the user carries out the input operation. The switch instruction corresponds to magnitudes of the parameter values.

Here, the object identification may include at least one of the following information of the display object: icon, text, number.

Step 505: acquiring the M sense points for representing the input operation through the sensing device, M is an integer larger than or equal to 1.

Step 506: deciding whether the M sense points satisfy a first predetermined condition to generate a first decision result.

Step 507: when the first decision result identifies that the M sense points satisfy the first predetermined condition, representing that the input operation is an input operation for stopping the display content of the display screen, and generating a stop instruction.

Step 508: controlling the second region of the display screen to display the N+1th data content corresponding to the N+1th object identification one by one in response to the stop instruction at the T+1th moment.

Here, the second region includes the first region, and T is an integer larger than or equal to 1.

As shown in FIG. 5-2, the third region 13 is a part of the display screen and does not overlap with the first region 11, and the second region 12 includes the first region 11 and the third region 13. The third region 13 is an intermediate region positioned in the second region, or the third region 13 is a bottom region or a top region positioned in the first region. The progress identifications corresponds to the object identifications one by one, and the progress identification is for indicating the positional relationship of the object identification positioned in the first region currently with respect to the complete set of the object identifications, for example, the object identifications in the complete set of the object identifications are totally 50, and when the first object identification is displayed, if the progress identification is represented by using the positional relationship, the progress identification corresponding to the first object identification is 1/50. If the progress identification is represented by using the progress relationship, the progress identification corresponding to the first object identification is 2%.

In the embodiments of the present disclosure, the method further includes:

Step A1: controlling to display a second object identifications in the first region of the display screen at the first moment in response to the switch instruction when the parameter values of the M sense points are less than a set threshold.

Step A2: controlling the second region of the display screen to display second data content corresponding to the second object identification one by one at a second moment when the sense points are not acquired through the sensing device in a predetermined time period.

In the embodiments of the present disclosure, the progress identification corresponding to the object identification is displayed in the display region of the display screen, thus the user can search the object identification needed by himself through the progress identification when he searches the object identification. As shown in FIG. 5-2, the object identifications in the complete set of the object identifications are totally 50, and the user wants to search a movie player (an application G2) at a certain moment, the object identification corresponding to the application G2 is the tenth countdown, and the progress identification is represented by using the positional relationship, then, the user searches the application G2 by a manner of quick browsing, and the user can make the electronic apparatus to be in a stage of displaying the object identifications in order all the time, and display the progress identification pages from 1/50 to 40/50, and at this time, the user can position the application G2 needed by himself, i.e., the movie player accurately by the stop operation, so as to improve the user experience.

Sixth embodiment

Figures 1, 2, 3, 4, 5, 6:
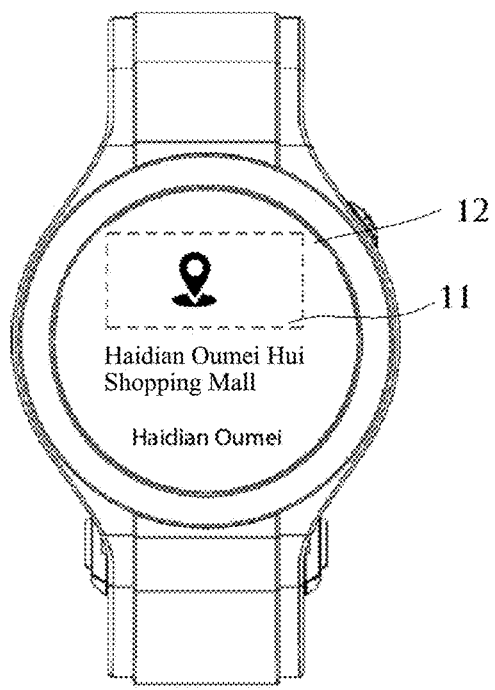

Based on the above-described first embodiment to fifth embodiment, the embodiments of the present disclosure provide an information processing method applied in an electronic apparatus, as shown in FIG. 6-1, the electronic apparatus includes a frame body 20 and a fixing device 10, the fixing device 10 is connected to the frame body 20, And the fixing device 10 is for fixing the electronic apparatus on an operational body. When the electronic apparatus is the smart watch, the fixing device is a watchband. The frame body 20 includes a functional main body including a display screen 21 and a display module 22, display principles of the display module 22 and the display screen 21 are different. As shown in FIG. 6-2, the display module 22 includes a display imaging unit 221. A top end face of the frame body is made of a transparent material, and the display screen 21 is provided under the top end face, and the display screen 21 corresponds to a first display output region 211 on the top end face, And the display module 22 corresponds to a second display output region 221 on the top end face. A first size of the first screen 21 is consistent with a size of the first display output region 211, and a second size of a second screen 22 is less than a size of the second display output region 221. A perceived size of the display content on the display screen 21 is consistent with the first display output region 211 when there is a first distance value between the electronic apparatus and an observer of the electronic apparatus; and a perceived size of the display content on the display module 22 is larger than the size of the second display output region 221 when there is a first distance value between the electronic apparatus and the observer of the electronic apparatus. For example, as shown in FIG. 6-3, wherein a light-spot 222 in the second display output region 221 may be an effect displayed and outputted by the display module 22. Further, when the user gets closer to the electronic apparatus, as shown in FIG. 6-4, abundant content can be seen through the light-spot 222 of the second display output region 221, and the content observed by the user exceeds content that can be carried by physical magnitude of the second display output region 221 greatly.

At the time of using the electronic apparatus as shown in FIG. 6-1 to FIG. 6-4, as shown in FIG. 6-5, the method includes:

Step 601: acquiring M sense points for representing an input operation through the sensing device.

Here, M is an integer larger than or equal to 1.

Step 602: deciding whether the M sense points satisfy a predetermined condition to generate a decision result.

Step 603: when the decision result identifies that the M sense points satisfy the predetermined condition, representing that the input operation is an input operation for changing the display content of the display screen, and generating a switch instruction.

Step 604: controlling a first object identification in the first region of the display screen to change to the N+1th object identification at a first moment in response to the switch instruction according to parameter values of the M sense points.

Here, N is an integer larger than or equal to 1.

Step 605: controlling the second region of the display screen to display N+1th data content corresponding to a N+1th object identification one by one in response to a stop instruction at a T+1th moment.

Here, the second region includes the first region, and T is an integer larger than or equal to 1.

Step 606: detecting whether there is the first distance value between the electronic apparatus and the observer to obtain a detection result.

Step 607: enabling the display module when the detection result represents that there is the first distance value between the electronic apparatus and the observer.

Step 608: displaying associated data content through the display module.

Here, the associated data content is related to the object identification displayed on the display screen and/or the data content corresponding to the object identification.

Here, the associated data content may be the above-described data content, and amount of information carried by the associated data content is more due to difference of display modes.

In the embodiments of the present disclosure, controlling the first object identification in the first region of the display screen to change to the N+1th object identification at the first moment in response to the switch instruction according to the parameter values of the M sense points includes:

Controlling to display n object identifications in order in the first region of the display screen when the parameter values of the M sense points are larger than a set threshold, wherein a last object identification in the n object identifications is the N+1th object identification, and 2≤n≤N. Here, a more specific technical solution may be referred to the above second embodiment, and it is no longer described for redundancy.

In the embodiments of the present disclosure, controlling the first object identification in the first region of the display screen to change to the N+1th object identification at the first moment in response to the switch instruction according to the parameter values of the M sense points includes:

Controlling to display a second object identifications in the first region of the display screen when the parameter values are less than a set threshold, wherein, the second object identification is the N+1th object identification. The second object identification is a next object identification of the first object identification. Here, a more specific technical solution may be referred to the above third embodiment, and it is no longer described for redundancy.

In the embodiments of the present disclosure, the method further includes:

At the time of controlling to display n object identifications in order in the first region of the display screen, the progress identification is controlled to be displayed in the third region of the display screen, and the progress identification is controlled to change with the n object identifications in the first region changes in order. The progress identification is for indicating a positional relationship/progress relationship of the object identification positioned in the first region currently with respect to a complete set of the object identifications. Here, a more specific technical solution may be referred to the above fifth embodiment, and it is no longer described for redundancy.

The information processing method provided by the present disclosure can output the data content through the first display output region and output the associated data content through the second display output region respectively by controlling the electronic apparatus, and the data content and the associated data content have different display effects. Thus, the information displayed by the electronic apparatus can be increased, and the user is made to obtain more detailed and accurate information by the manner of expanded display, so as to improve the efficiency of usage of the electronic apparatus and improve user's usage experience.

Seventh embodiment

Figures 1, 2, 3, 4, 5, 6, 7:

Based on the information processing method provided by the above-described embodiment, the embodiments of the present disclosure provide an electronic apparatus including a display screen and a sensing device, FIG. 7 is a schematic diagram of constituent structure of the electronic apparatus of the seventh embodiment of the present disclosure. as shown in FIG. 7, the electronic apparatus includes an acquiring unit 701, a deciding unit 702, a generating unit 703, a changing unit 704 and a first control unit 705, wherein:

The acquiring unit 701 is for acquiring M sense points for representing an input operation through the sensing device, M is an integer larger than or equal to 1.

The deciding unit 702 is for deciding whether the M sense points satisfy a predetermined condition to generate a decision result.

The generating unit 703 is for representing that the input operation is an input operation for changing the display content of the display screen when the decision result identifies that the M sense points satisfy the predetermined condition, and generating a switch instruction.

The changing unit 704 is for controlling a first object identification in the first region of the display screen to change to a N+1th object identification at a first moment in response to the switch instruction according to the parameter values of the M sense points, and N is an integer larger than or equal to 1.

The first control unit 705 is for controlling the second region including the first region of the display screen to displayed N+1th data content corresponding to the N+1th object identification one by one at a T+1th moment, and T is an integer larger than or equal to 1.

Here, the display screen and the sensing device may be an integrated device, that is, the integrated device may have a display function of the display screen and a sensing function of the sensing device, and in a specific implementation procedure, the integrated device may be a touch control display screen, and the touch control display screen includes a touch control display screen of capacitive type, a touch control display screen of resistive type, and a touch control display screen of inductive type, and so on. When the sensing device is the touch control display screen, correspondingly, the sense points are touch control points on the touch control display screen.

Here, the predetermined condition is a preset condition representing changing display content of the display screen.

Here, N is an integer larger than or equal to 1. The parameter values may be a degree of force applied by the user sensed by the sensing device or acceleration sensed by the sensing device or the like when the user carries out the input operation. The switch instruction corresponds to magnitudes of the parameter values. The object identification may include at least one of the following information of the display object: icon, text, number. The first region is a part of the display region of the display screen.

Here, the second region includes the first region, and T is an integer larger than or equal to 1. The second region may be all of the display region of the display screen, of course, it may also be a part of the display region of the display screen.

As shown in FIG. 1-2 to FIG. 1-4, for example, the electronic apparatus is the smart watch, and a dial plate of the smart watch may be a circular shape or a rectangle shape or the like. The display region of the electronic apparatus is the second region 12, and the second region 12 includes the first region 11. in FIG. 1-2 and FIG. 1-3, in order to display magnitude relation between the first region 11 and the second region 12 clearly, the first region 11 is identified with dotted line box, and in specific implementation procedure, the first region 11 does not have the dotted line box.

The technical solution provided by the embodiments of the present disclosure may be used in the following scenes, for example, the user is running, and the electronic apparatus display a first object identification as shown in FIG. 1-2 at this time. When the user wants to see if there is any shop nearby when he runs to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. The first object identification in the first region 11 of the display screen changes to the N+1th object identification as shown in FIG. 1-3 at the first moment in response to the switch instruction according to the parameter values of the M sense points. At the T+1th moment, as shown in FIG. 1-4, the electronic apparatus controls the second region of the display screen to display the N+1th data content corresponding to the N+1th object identification as shown in FIG. 1-3 one by one.

Eighth embodiment

Figures 1, 2, 3, 4, 5, 6, 7, 8:
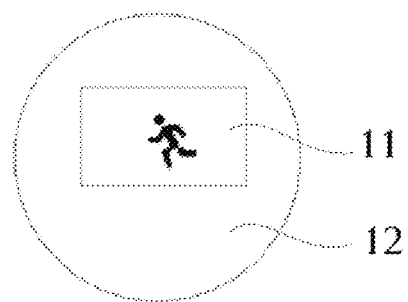

Based on the above-described seventh embodiment, the embodiments of the present disclosure provide an electronic apparatus including a display screen and a sensing device, FIG. 8 is a schematic diagram of constituent structure of the electronic apparatus of the eighth embodiment of the present disclosure. as shown in FIG. 8, the electronic apparatus includes an acquiring unit 801, a deciding unit 802, a generating unit 803, a changing unit 804, a first acquiring unit 805, a first deciding unit 806, a first generating unit 807 and a first control unit 808, wherein the changing unit 804 includes a first determining module 841 and a first control module 842. Wherein:

The acquiring unit 801 is for acquiring M sense points for representing an input operation through the sensing device, M is an integer larger than or equal to 1.

The deciding unit 802 is for deciding whether the M sense points satisfy a predetermined condition to generate a decision result.

The generating unit 803 is for representing that the input operation is an input operation for changing the display content of the display screen when the decision result identifies that the M sense points satisfy the predetermined condition, and generating a switch instruction.

The first determining module 841 is for triggering the first control module 742 in response to the switch instruction when it determines that the parameter values of the M sense points are larger than a set threshold.

The first control module 842 is for controlling to display n object identifications in order in the first region of the display screen during the first moment to the N+1th moment, wherein, a last object identification in the n object identifications is the N+1th object identification, and 2≤n≤N.

The first acquiring unit 805 is for acquiring M sense points for representing an input operation through the sensing device, and M is an integer larger than or equal to 1.

The first deciding unit 806 is for deciding whether the M sense points satisfy a first predetermined condition to generate a first decision result.

The first generating unit 807 is for representing that the input operation is an input operation for stopping the display content of the display screen when the first decision result identifies that the M sense points satisfy the first predetermined condition, and generating a stop instruction.

The first control unit 808 is for controlling the second region of the display screen to display N+1th data content corresponding to the N+1th object identification one by one in response to the stop instruction at the T+1th moment.

Here, the second region includes the first region. Wherein, a last object identification of the n object identifications are the N+1th object identification, 2≤n≤N, and N is an integer larger than or equal to 1.

Here, the parameter values may be a degree of force applied by the user sensed by the sensing device or acceleration sensed by the sensing device or the like when the user carries out the input operation. The object identification may include at least one of the following information of the display object: icon, text, number.

Here, the second region includes the first region, and T is an integer larger than or equal to 1, and the T+1th moment is after the N+1th moment.

The technical solution provided by the embodiments of the present disclosure may be used in the following scenes, for example, the user is running, and the electronic apparatus display a first object identification as shown in FIG. 2-2 at this time. When the user wants to see if there is any shop nearby when he runs to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. N object identifications are controlled to be displayed in order in the first region of the display screen during the first moment to the N+1th moment in response to the switch instruction when the parameter values of the M sense points are larger than a set threshold. As shown in FIG. 2-3, at the time of displaying the N+1th object identification, the user see that the N+1th object identification is the object identification needed by the user, that is, the N+1th object identification is an object identification of an application for representing which shop is nearby, and then, the user carries out the first input operation to the electronic apparatus, and the electronic apparatus acquires the M sense points through the sensing device and decides whether the M sense points satisfy the first predetermined condition to generate the first decision result. When the first decision result identifies that the M sense points satisfy the first predetermined condition, it represents that the input operation is the input operation for stopping the display content of the display screen, and generating the stop instruction. As shown in FIG. 2-4, the second region of the display screen is controlled to display the N+1th data content corresponding to the N+1th object identification one by one in response to the stop instruction at the T+1th moment.

In the embodiment of the present disclosure, the electronic apparatus detects whether the parameter values of the M sense points are larger than the set threshold, and carries out fast switch of the object identifications corresponding to the applications when the parameter values of the sense points are larger than the set threshold, thus time of the user can be saved, and when the user see the object identification needed by himself, he can view carefully by inputting a stop operation. Thus, the technical solution provided by the embodiment of the present disclosure can make the user to position the information needed by himself quickly and accurately, so as to improve the efficiency of use and in turn improve the user experience.

Ninth embodiment

Figures 1, 2, 3, 4, 5, 6, 7, 8, 9:
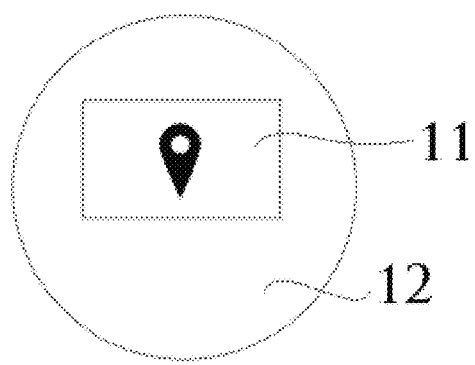

Based on the above-described seventh embodiment, the embodiments of the present disclosure provide an electronic apparatus including a display screen and a sensing device, FIG. 9 is a schematic diagram of constituent structure of the electronic apparatus of the ninth embodiment of the present disclosure. as shown in FIG. 9, the electronic apparatus includes an acquiring unit 901, a deciding unit 902, a generating unit 903, a changing unit 904 and a first control unit 905, the changing unit 904 includes a second determining module 941 and a second control module 942, wherein:

The acquiring unit 901 is for acquiring M sense points for representing an input operation through the sensing device, and M is an integer larger than or equal to 1.

The deciding unit 902 is for deciding whether the M sense points satisfy a predetermined condition to generate a decision result.

The generating unit 903 is for representing that the input operation is an input operation for changing the display content of the display screen when the decision result identifies that the M sense points satisfy the predetermined condition, and generating a switch instruction.

The second determining module 941 is for triggering the second control module in response to the switch instruction when it determines that the parameter values of the M sense points are less than a set threshold.

Wherein, the second object identification is the N+1th object identification. The second object identification is a next object identification of the first object identification, and N is an integer larger than or equal to 1.

Here, the parameter values may be a degree of force applied by the user sensed by the sensing device or acceleration sensed by the sensing device or the like when the user carries out the input operation. The switch instruction corresponds to magnitudes of the parameter values. The object identification may include at least one of the following information of the display object: icon, text, number.

The second control module 942 is for controlling to display a second object identification in the first region of the display screen, wherein, the second object identification is the N+1th object identification. The second object identification is a next object identification of the first object identification.

The first control unit 905 is for controlling the second region of the display screen to display second data content corresponding to the second object identification one by one at a second moment when the sense points are not acquired through the sensing device in a predetermined time period.

Here, the second region includes the first region.

The technical solution provided by the embodiments of the present disclosure may be used in the following scenes, for example, the user is running, and the electronic apparatus display a first object identification as shown in FIG. 2-2 at this time. When the user wants to have a rest when he run to a certain place, the user carries out the input operation to the electronic apparatus, and then the sensing device of the electronic apparatus acquires M sense points, and then the electronic apparatus decides whether the M sense points satisfy the predetermined condition to generate the decision result. When the decision result identifies that the M sense points satisfy the predetermined condition, it represents that the input operation is the input operation for changing the display content of the display screen, and the switch instruction is generated. When the parameter values of the M sense points are less than a set threshold, a second object identification as shown in FIG. 3-2 is controlled to be displayed in the first region of the display screen at the first moment in response to the switch instruction, and the second object identification is an object identification of an application music player. And then, when the sense points are not acquired through the sensing device in the predetermined time period, that is, when the user does not operate the electronic apparatus in the predetermined time period, as shown in FIG. 3-3, the second region 12 of the display screen is controlled to display the second data content corresponding to the second object identification one by one at the second moment.

In the embodiments of the present disclosure, the electronic apparatus detects whether the parameter values of the M sense points are larger than the set threshold, and switches the object identifications corresponding to the applications slowly when the parameter values of the sense points are less than the set threshold, and displays the data content corresponding to the object identifications when the user does not make any input. Thus, the technical solution provided by the embodiments of the present disclosure make the user to be able to view specific data content of the applications by viewing the object identifications corresponding to the applications one by one, so as to improve the efficiency of use and in turn improve the user experience.

Tenth embodiment

Figures 1, 2, 3, 4, 5, 6, 7, 8, 9, 10:
Figures 1, 2:
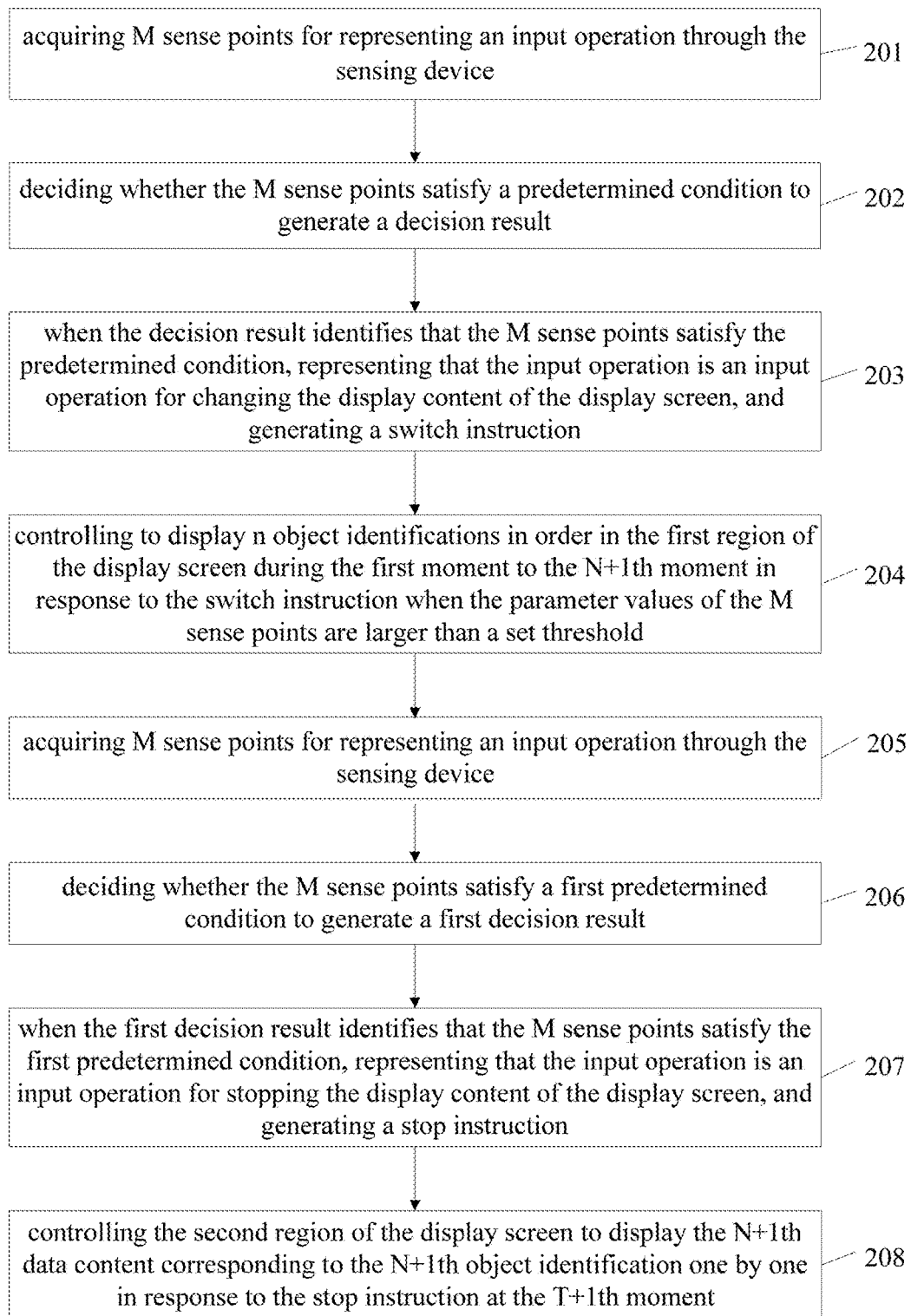
Figure 2:
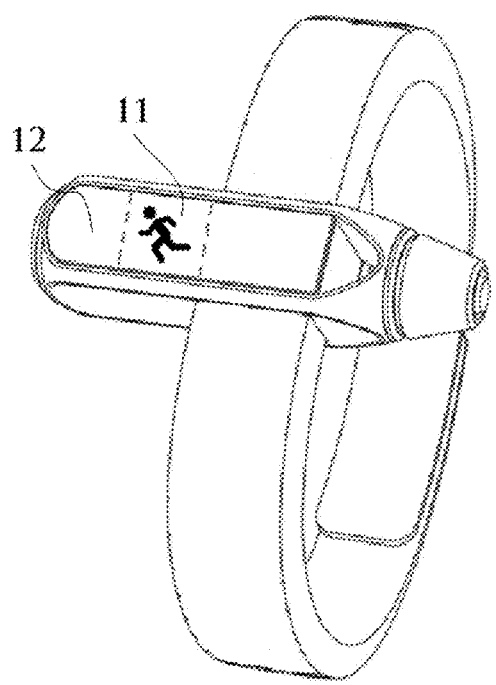
Figures 2, 3:
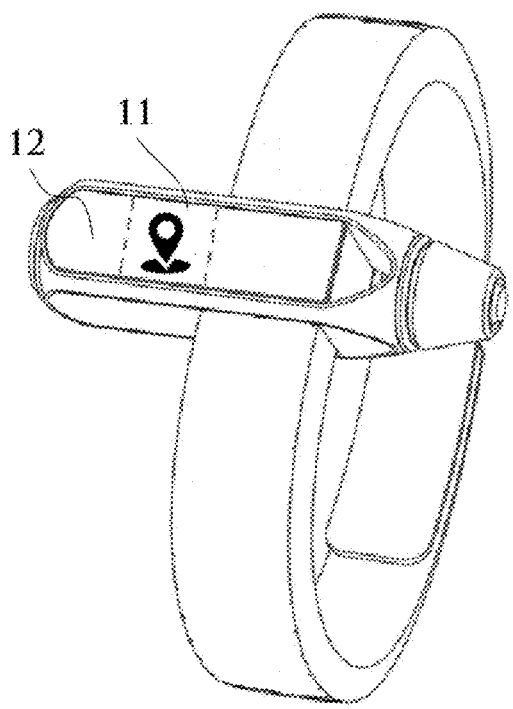
Figures 2, 3, 4:
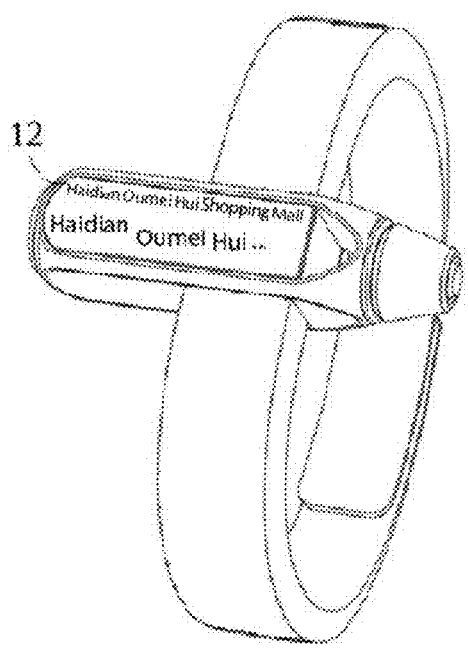
Figures 1, 3:
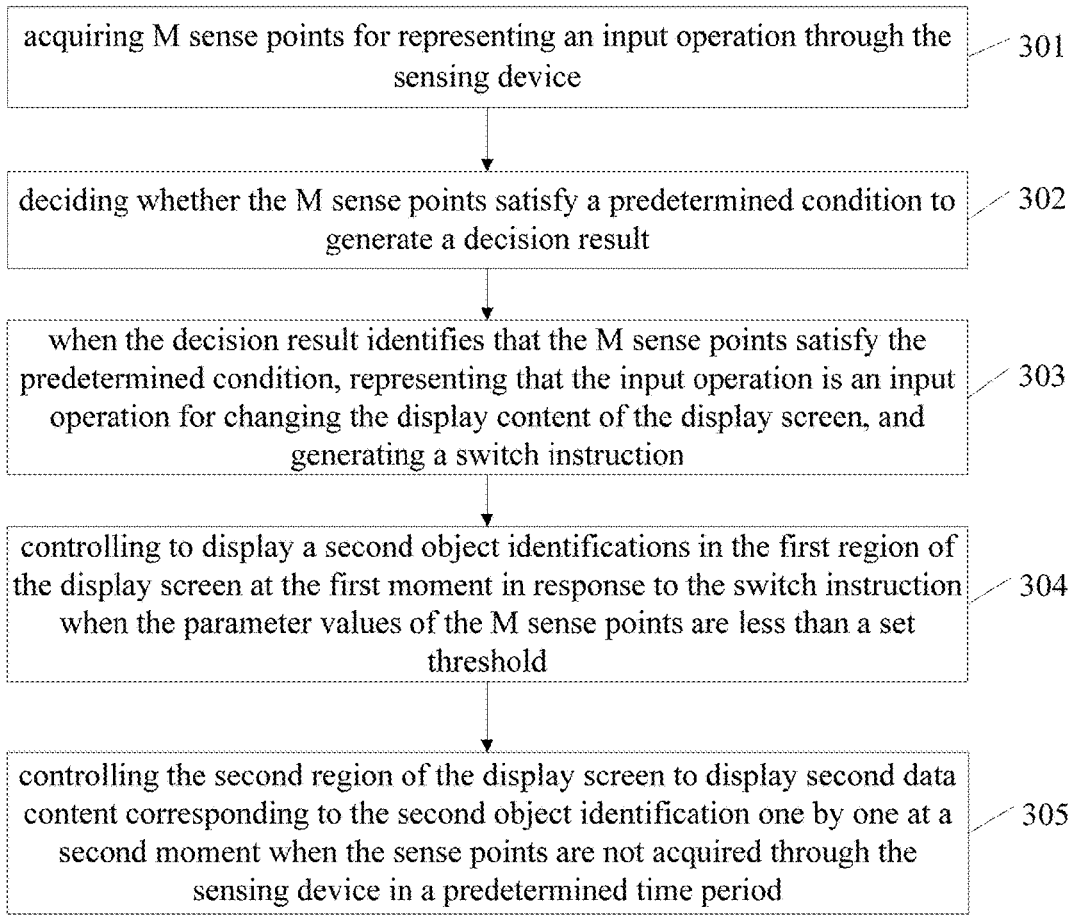
Figures 2, 3:
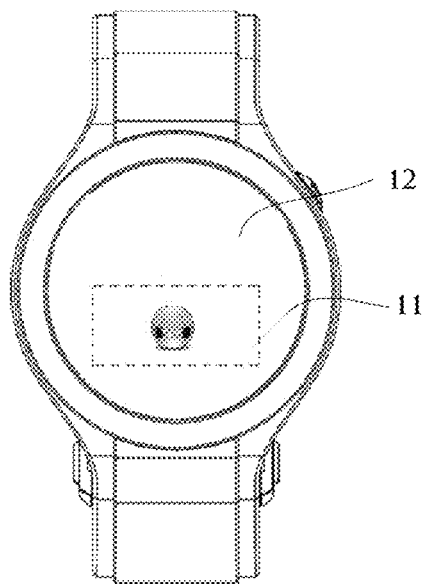
Figure 3:
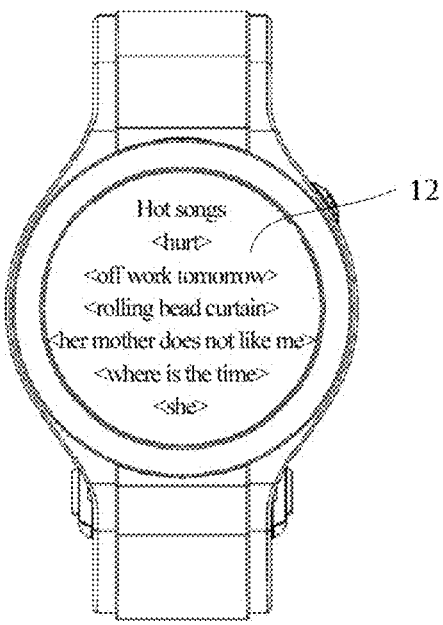
Figures 3, 4:
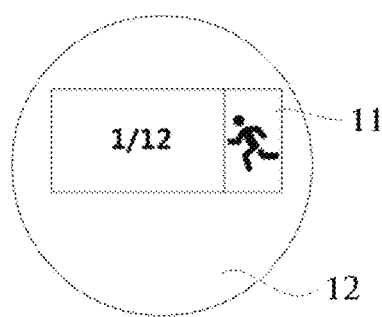
Figures 3, 4, 5:
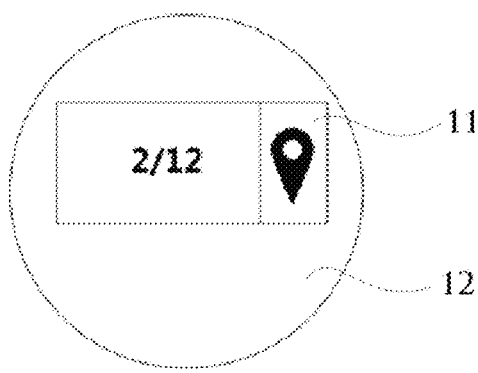
Figures 3, 4, 5, 6:
Figures 3, 4, 5, 6, 7:
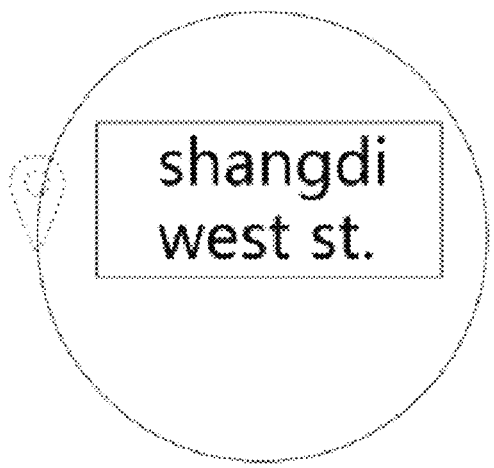
Figures 3, 4, 5, 6, 7, 8:
Figures 3, 4, 5, 6, 7, 8, 9:
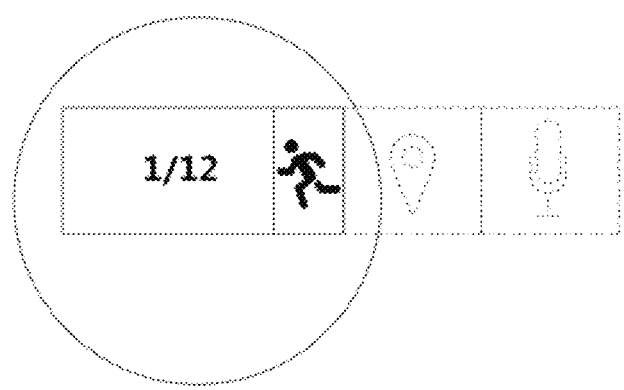
Figures 3, 4, 5, 6, 7, 8, 9, 10:
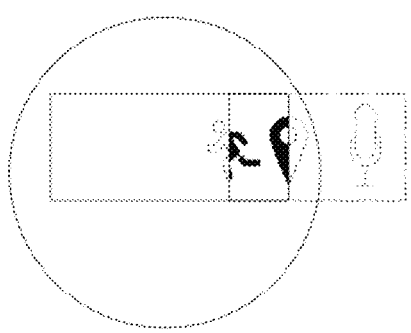
Figure 4:
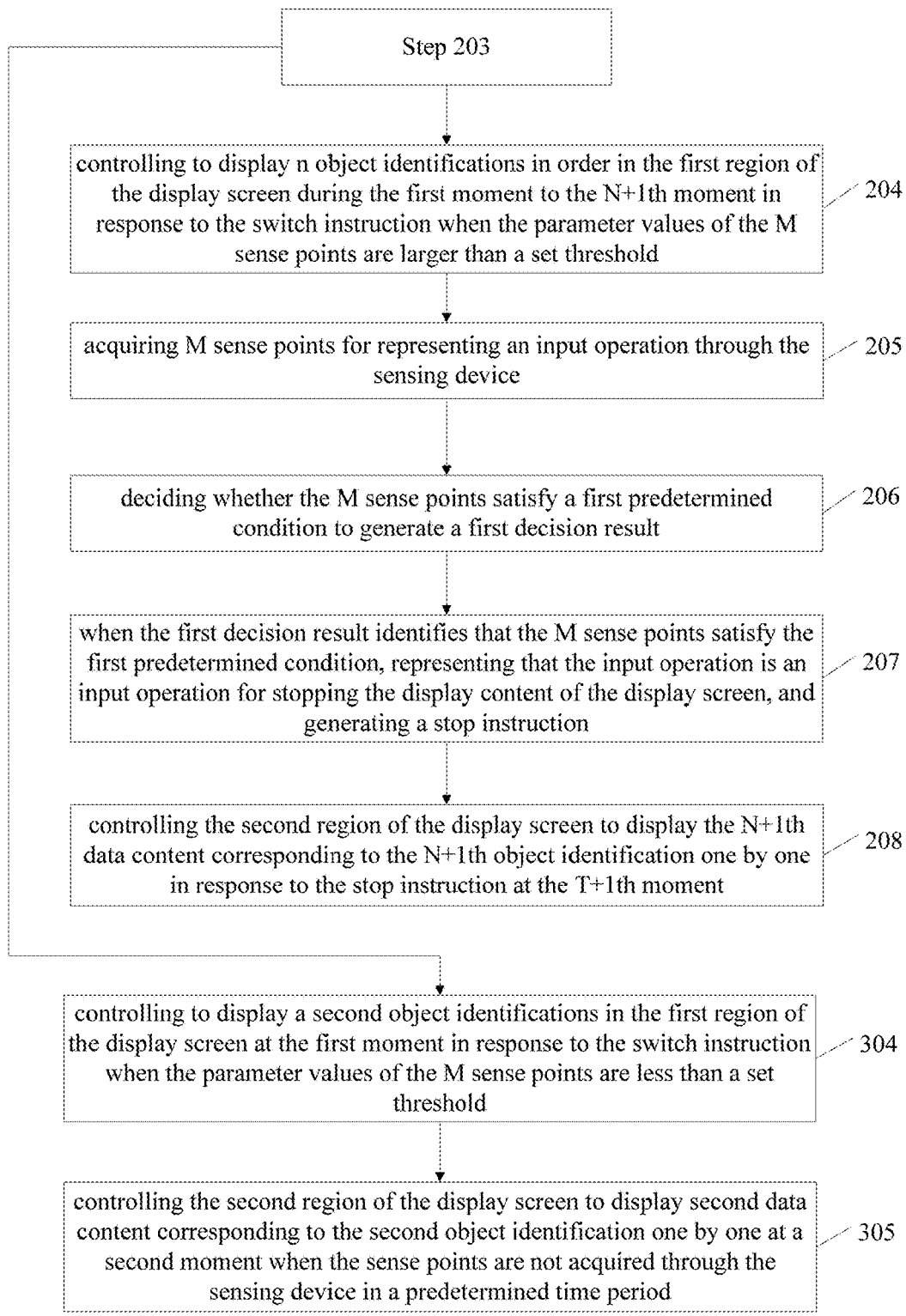
Figures 1, 5:
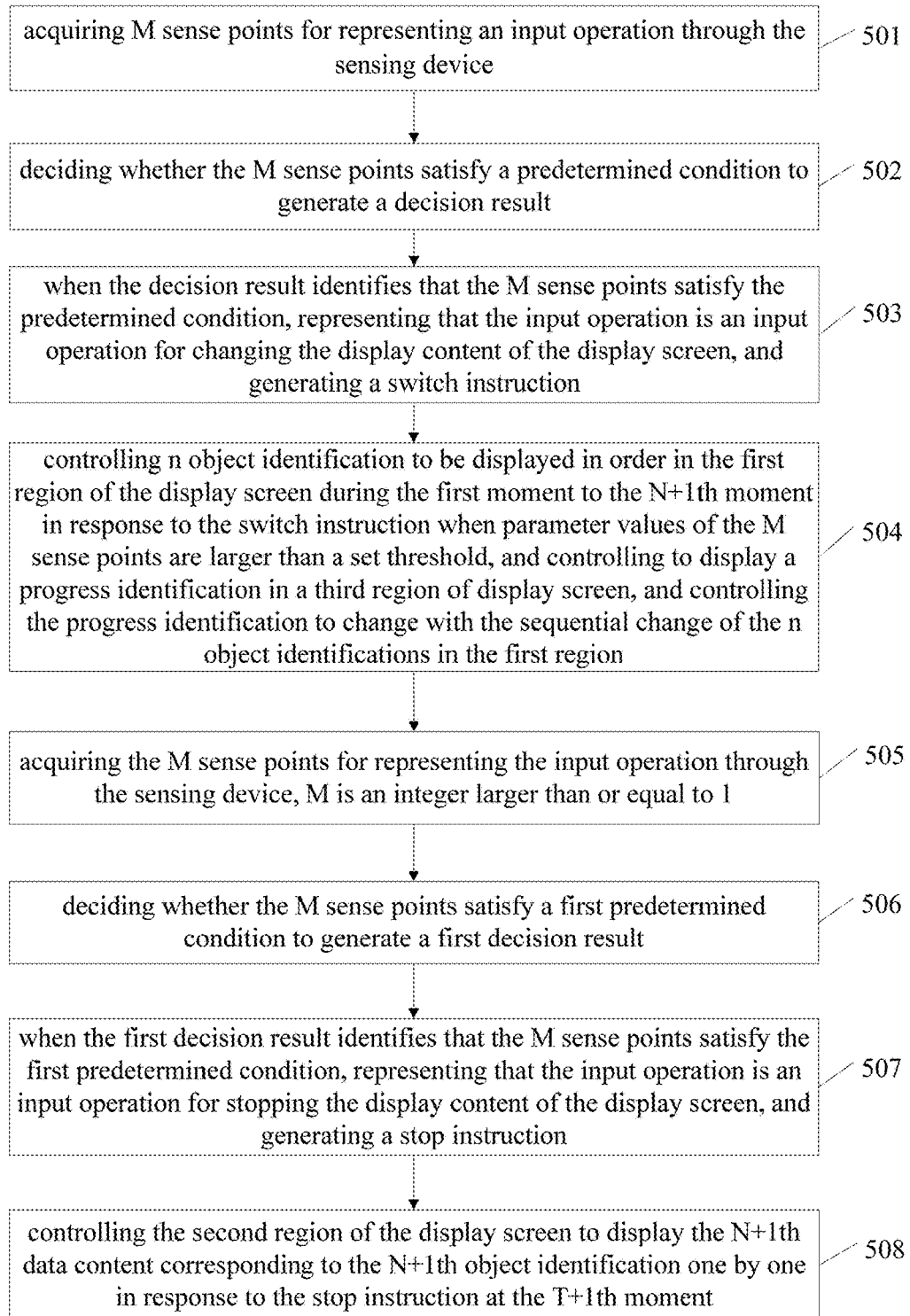
Figures 2, 5:
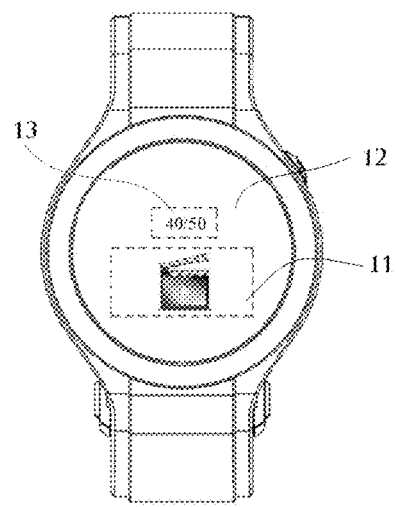
Figures 1, 6:
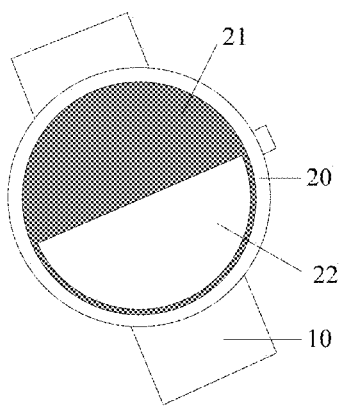
Figures 2, 6:
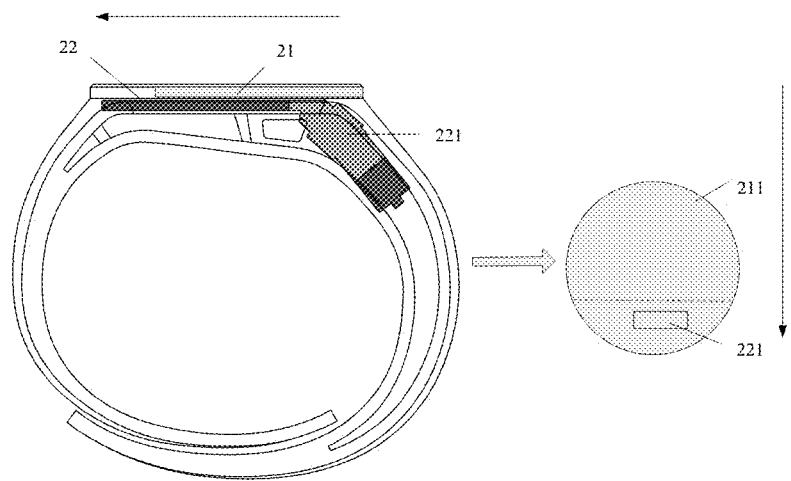
Figures 3, 6:
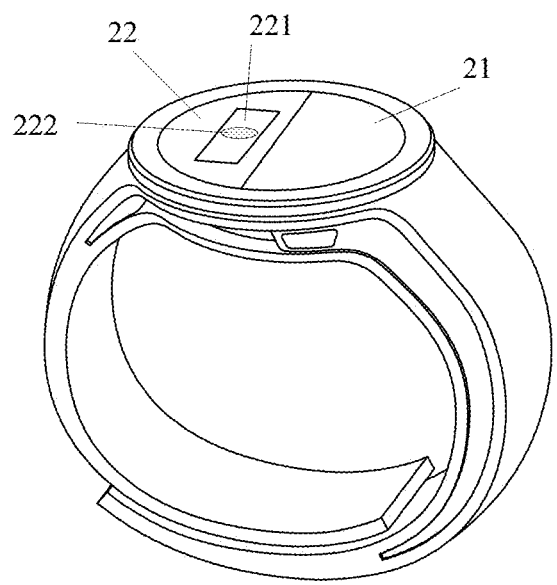
Figures 4, 6:
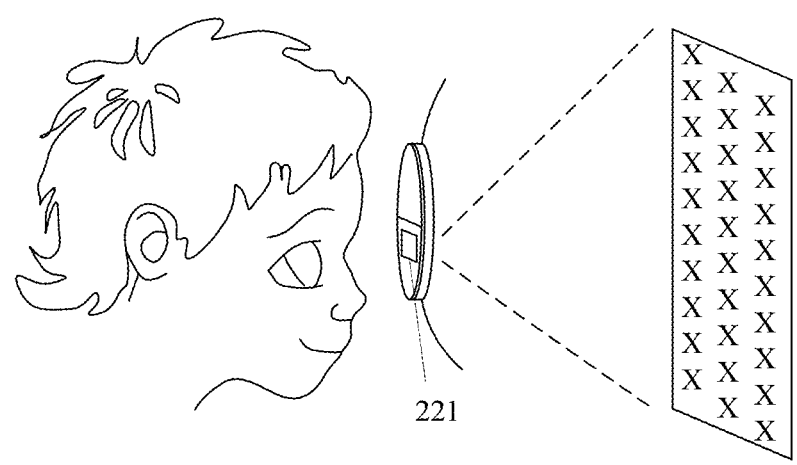
Figures 5, 6:
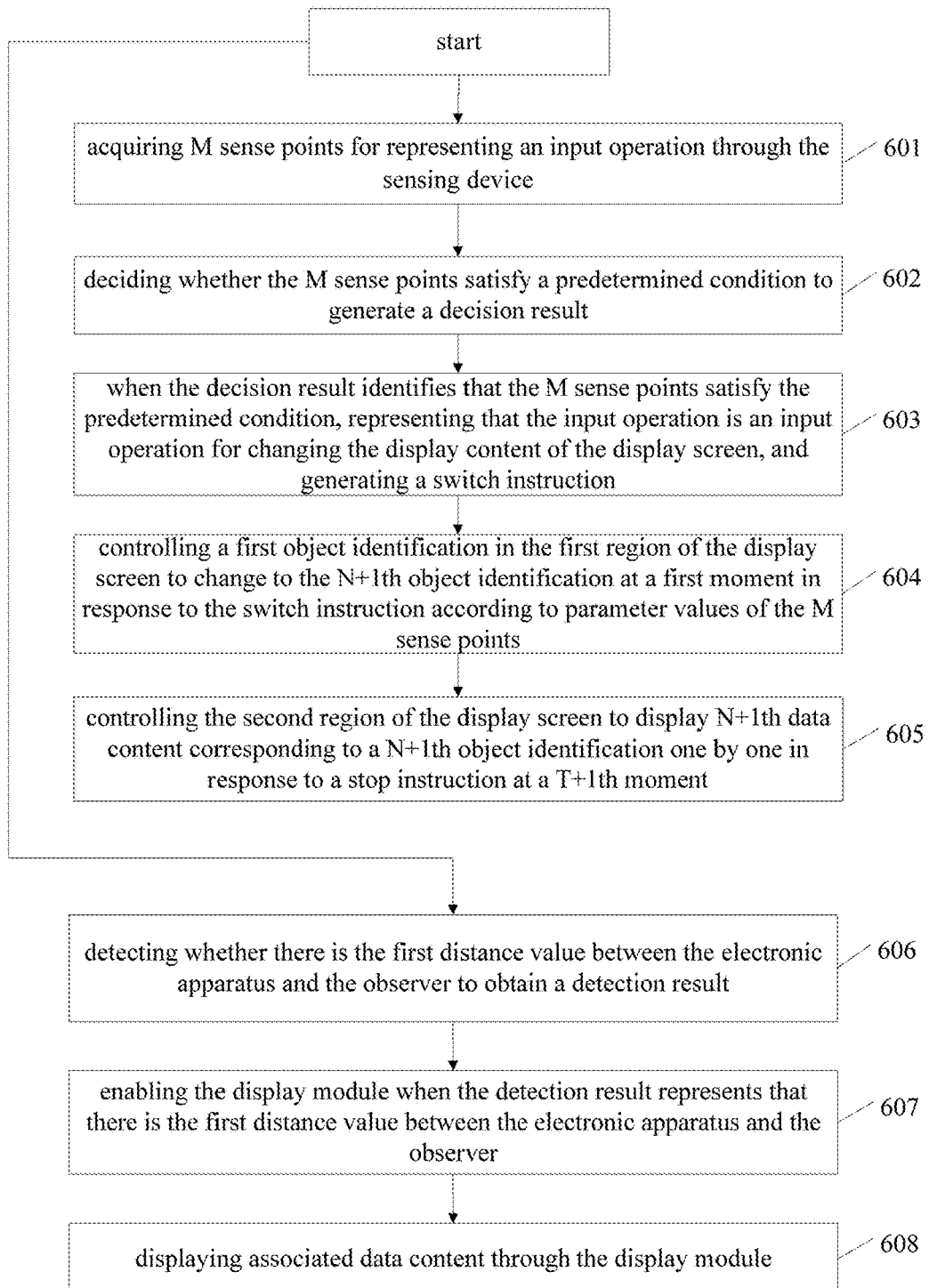
Figure 7:
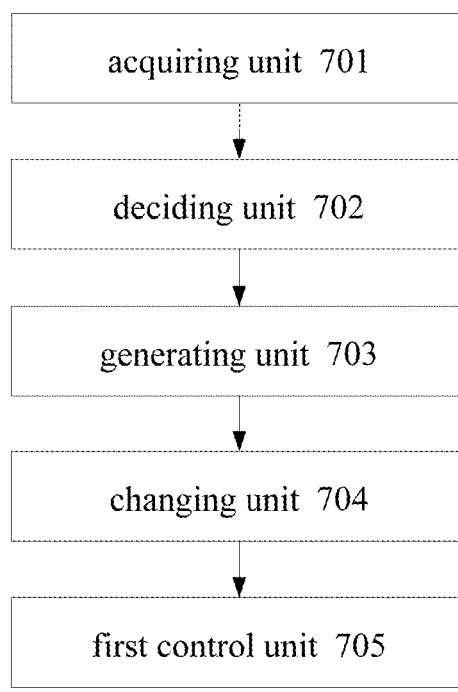
Figure 8:
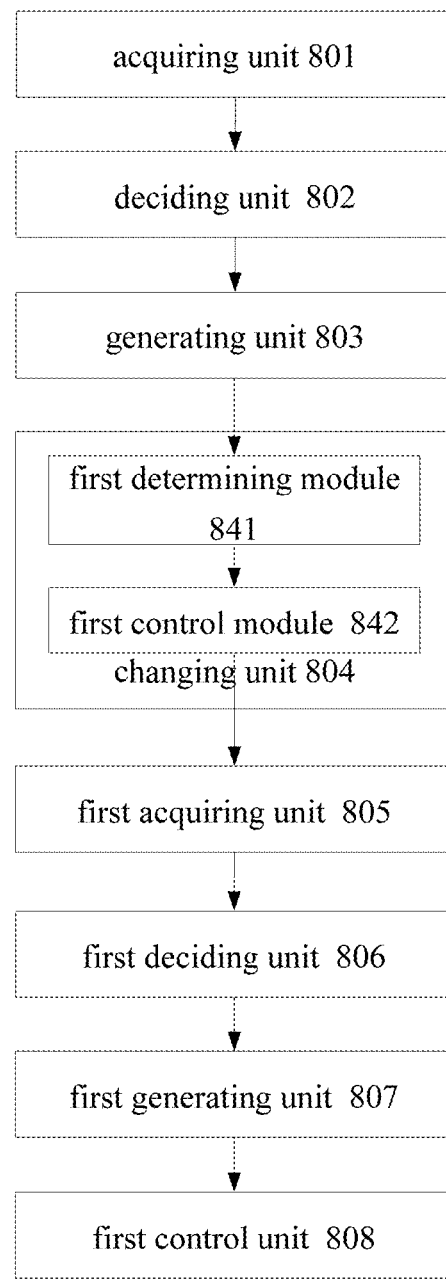
Figure 9:
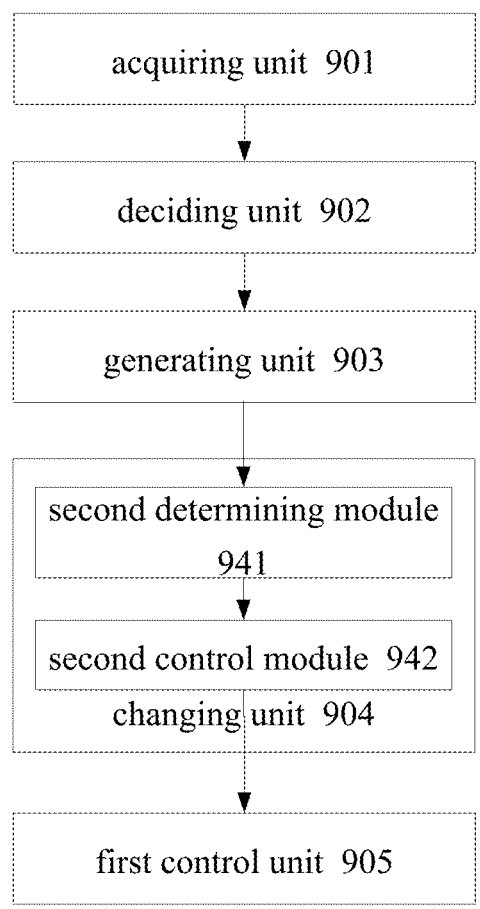
Figure 10:
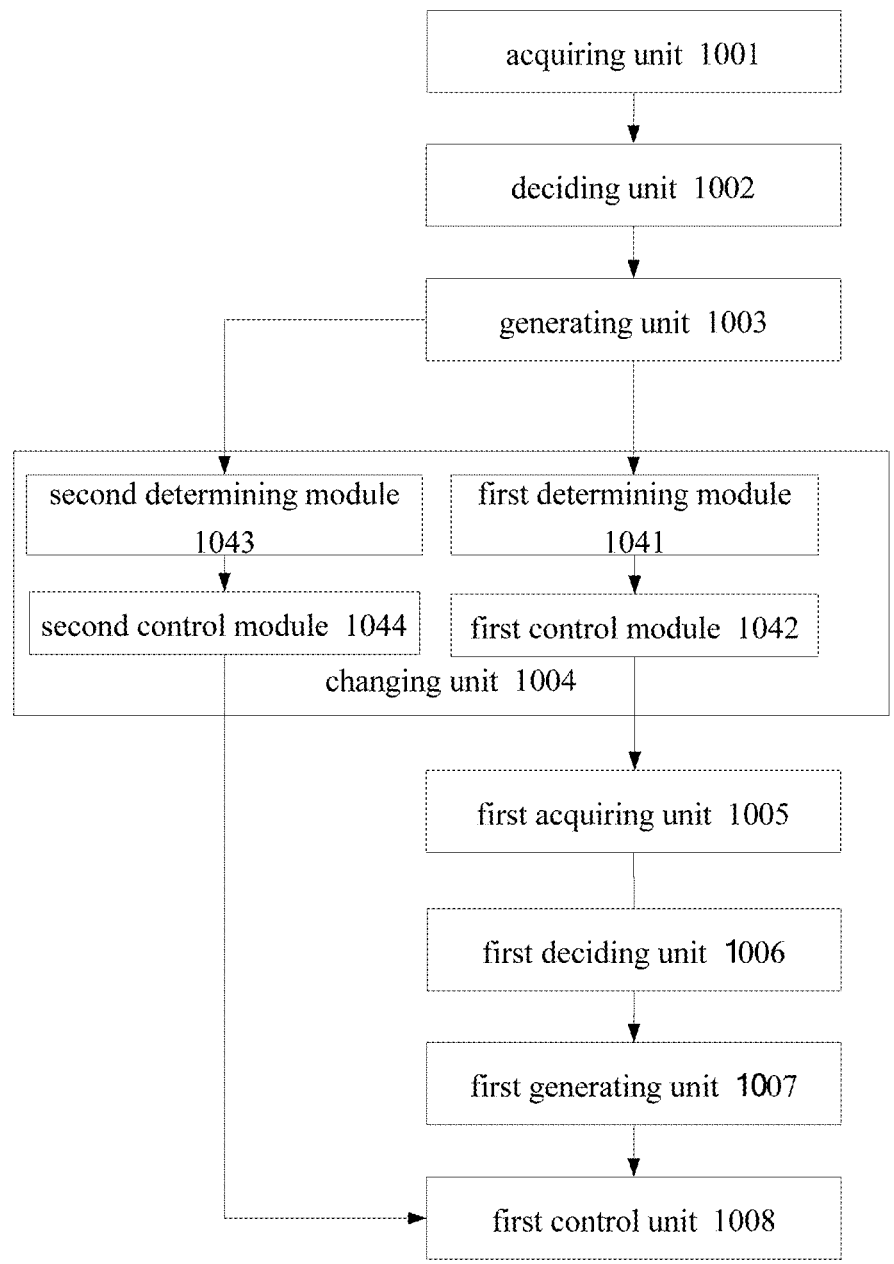

Based on the above-described eighth embodiment and ninth embodiment, the embodiments of the present disclosure provide an electronic apparatus including a display screen and a sensing device, FIG. 10 is a schematic diagram of constituent structure of the electronic apparatus of the ninth embodiment of the present disclosure. as shown in FIG. 10, the electronic apparatus includes an acquiring unit 1001, a deciding unit 1002, a generating unit 1003, a changing unit 1004 and a first acquiring unit 1005, a first deciding unit 1006, a first generating unit 1007 and a first control unit 808, wherein the changing unit 1004 includes a first determining module 1041, a first control module 1042, a second determining module 1043 and a second control module 1044. Wherein:

The acquiring unit 1001 is for acquiring M sense points for representing an input operation through the sensing device, and M is an integer larger than or equal to 1.

The deciding unit 1002 is for deciding whether the M sense points satisfy a predetermined condition to generate a decision result.

The generating unit 1003 is for representing that the input operation is an input operation for changing the display content of the display screen when the decision result identifies that the M sense points satisfy the predetermined condition, and generating a switch instruction.

The first determining module 1041 is for triggering the first control module in response to the switch instruction when it determines that the parameter values of the M sense points are larger than a set threshold.

The first control module 1042 is for controlling to display n object identifications in order in the first region of the display screen during a first moment to a N+1th moment, wherein, a last object identification in the n object identifications is a N+1th object identification, and 2≤n≤N.

The second determining module 1043 is for triggering the second control module in response to the switch instruction when it determines that the parameter values of the M sense points are less than a set threshold.

The second control module 1044 is for controlling to display a second object identification in the first region of the display screen at the first moment, wherein, the second object identification is the N+1th object identification. The second object identification is a next object identification of the first object identification.

The first acquiring unit 1005 is for acquiring M sense points for representing an input operation through the sensing device, and M is an integer larger than or equal to 1.

The first deciding unit 1006 is for deciding whether the M sense points satisfy a first predetermined condition to generate a first decision result.

The first generating unit 1007 is for representing that the input operation is an input operation for stopping the display content of the display screen when the first decision result identifies that the M sense points satisfy the first predetermined condition, and generating a stop instruction.

The first control unit 1008 is for controlling the second region of the display screen to display N+1th data content corresponding to the N+1th object identification one by one in response to the stop instruction at the T+1th moment; or, for controlling the second region of the display screen to display second data content corresponding to the second object identification one by one at a second moment when the sense points are not acquired through the sensing device in the predetermined time period.

Here, the second region includes the first region.

Eleventh embodiment

Based on the above-described eighth embodiment, the embodiments of the present disclosure provide an electronic apparatus including a display screen and a sensing device, the electronic apparatus includes an acquiring unit, a deciding unit, a generating unit, a changing unit, a first acquiring unit, a first deciding unit and a first control unit, wherein the changing unit includes a first determining module and a first control module.

The acquiring unit is for acquiring M sense points for representing an input operation through the sensing device, and M is an integer larger than or equal to 1.

The deciding unit is for deciding whether the M sense points satisfy a predetermined condition to generate a decision result.

The generating unit is for representing that the input operation is an input operation for changing the display content of the display screen when the decision result identifies that the M sense points satisfy the predetermined condition, and generating a switch instruction.

The first determining module is for triggering the first control module in response to the switch instruction when it determines that the parameter values of the M sense points are larger than a set threshold.

The first control module is further for controlling to display n object identifications in order in the first region of the display screen and controlling to display a progress identification in a third region of the display screen and controlling to change the progress identification with the n object identifications in the first region changes in order during the first moment to the N+1th moment.

Wherein, the progress identification is for indicating a positional relationship/progress relationship of the object identification positioned in the first region currently with respect to a complete set of the object identifications. A last object identification in the n object identifications is the N+1th object identification, and 2≤n≤N.

The first acquiring unit is for acquiring M sense points for representing an input operation through the sensing device, and M is an integer larger than or equal to 1.

The first deciding unit is for deciding whether the M sense points satisfy a first predetermined condition to generate a first decision result.

The first generating unit is for representing that the input operation is an input operation for stopping the display content of the display screen when the first decision result identifies that the M sense points satisfy the first predetermined condition, and generating a stop instruction.

The first control unit is for controlling the second region of the display screen to display N+1th data content corresponding to a N+1th object identification one by one in response to the stop instruction at a T+1th moment.

In the embodiments of the present disclosure, the progress identification corresponding to the object identification is displayed in the display region of the display screen, thus the user can search the object identification needed by himself through the progress identification when he searches the object identification. As shown in FIG. 5-2, the object identifications in the complete set of the object identifications are totally 50, and the user wants to search a movie player (an application G2) at a certain moment, the object identification corresponding to the application G2 is the tenth countdown, and the progress identification is represented by using the positional relationship, then, the user searches the application G2 by a manner of quick browsing, and the user can make the electronic apparatus to be in a stage of displaying the object identifications in order all the time, and display the progress identification pages from 1/50 to 40/50, and at this time, the user can position the application G2 needed by himself, i.e., the movie player accurately by the stop operation, so as to improve the user experience.

Twelfth embodiment

Based on the above-described seventh embodiment, the embodiments of the present disclosure provide an information processing method applied in an electronic apparatus, as shown in FIG. 6-1, the electronic apparatus includes a frame body 20 and a fixing device 10, the fixing device 10 is connected to the frame body 20, And the fixing device 10 is for fixing the electronic apparatus on an operational body. When the electronic apparatus is the smart watch, the fixing device is a watchband. The frame body 20 includes a functional main body including a display screen 21 and a display module 22, display principles of the display module 22 and the display screen 21 are different. As shown in FIG. 6-2, the display module 22 includes a display imaging unit 221, A top end face of the frame body is made of a transparent material, and the display screen 21 is provided under the top end face, and the display screen 21 corresponds to a first display output region 211 on the top end face, and the display module 22 corresponds to a second display output region 221 on the top end face. A first size of the first screen 21 is consistent with a size of the first display output region 211, and a second size of a second screen 22 is less than a size of the second display output region 221. A perceived size of the display content on the display screen 21 is consistent with the first display output region 211 when there is a first distance value between the electronic apparatus and an observer of the electronic apparatus; and a perceived size of the display content on the display module 22 is larger than the size of the second display output region 221 when there is a first distance value between the electronic apparatus and the observer of the electronic apparatus. For example, as shown in FIG. 6-3, wherein a light-spot 222 in the second display output region 221 may be an effect displayed and outputted by the display module 22. Further, when the user gets closer to the electronic apparatus, as shown in FIG. 6-4, abundant content can be seen through the light-spot 222 of the second display output region 221, and the content observed by the user exceeds content that can be carried by physical magnitude of the second display output region 221 greatly.

Figure 11:
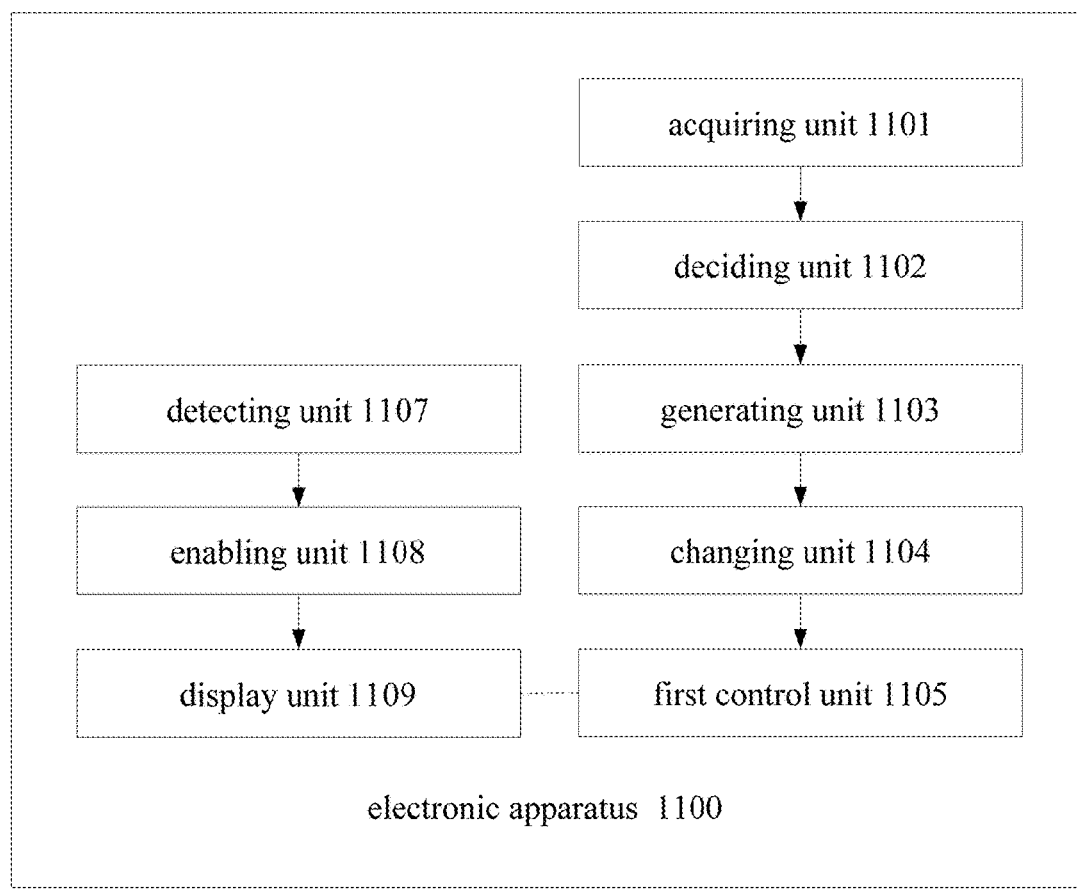
FIG. 11 is a schematic diagram of the electronic apparatus of the eleventh embodiment of the present disclosure.

At the time of using the electronic apparatus as shown in FIG. 6-1 to FIG. 6-4, as show in FIG. 11, the electronic apparatus 1100 includes an acquiring unit 1101, a deciding unit 1102, a generating unit 1103, a changing unit 1104, a first control unit 1105, a detecting unit 1107, an enabling unit 1108 and a display unit 1109, wherein:

The acquiring unit 1101 is for acquiring M sense points for representing an input operation through the sensing device, and M is an integer larger than or equal to 1.

The deciding unit 1102 is for deciding whether the M sense points satisfy a predetermined condition to generate a decision result.

The generating unit 1103 is for representing that the input operation is an input operation for changing the display content of the display screen when the decision result identifies that the M sense points satisfy the predetermined condition, and generating a switch instruction.

The changing unit 1104 is for controlling a first object identification in the first region of the display screen to change to a N+1th object identification at a first moment in response to the switch instruction according to the parameter values of the M sense points, and N is an integer larger than or equal to 1.

The first control unit 1105 is for controlling the second region including the first region of the display screen to displayed N+1th data content corresponding to the N+1th object identification one by one at a T+1th moment, and T is an integer larger than or equal to 1.

The detecting unit 1107 is for detecting whether there is a first distance value between the electronic apparatus and the observer to obtain a detection result.

The enabling unit 1108 is for enabling the display module when the detection result represents that there is a first distance value between the electronic apparatus and the observer.

The display unit 1109 is for displaying associated data content through the display module, the associated data content is related to the object identification displayed on the display screen and/or the data content corresponding to the object identification.

In the embodiments of the present disclosure, the changing unit includes a first determining module and a first control module, wherein:

The first determining module is for triggering the first control module when it determines that the parameter values are larger than a set threshold.

The first control module is for controlling to display n object identifications in order in the first region of the display screen, wherein, a last object identification in the n object identifications is the N+1th object identification, and 2≤n≤N. Here, a more specific technical solution may be referred to the above eighth embodiment, and it is no longer described for redundancy.

In the embodiments of the present disclosure, the changing unit includes a second determining module and a second control module, wherein:

The second determining module is for triggering the second control module when it determines that the parameter values are less than a set threshold.

The second control module is for controlling to display a second object identification in the first region of the display screen, wherein, the second object identification is the N+1th object identification. The second object identification is a next object identification of the first object identification. Here, a more specific technical solution may be referred to the above ninth embodiment, and it is no longer described for redundancy.

In the embodiments of the present disclosure, the electronic apparatus further includes a second control unit for controlling to display a progress identification in a third region of the display screen and controlling to change the progress identification with the n object identifications in the first region changes in order when the n object identifications are controlled to be displayed in order in the first region of the display screen. The progress identification is for indicating a positional relationship/progress relationship of the object identification positioned in the first region currently with respect to a complete set of the object identifications. Here, a more specific technical solution may be referred to the above eleventh embodiment, and it is no longer described for redundancy.

The information processing method and the electronic apparatus provided by the embodiments of the present disclosure acquires the M sense points for representing the input operation through the sensing device firstly; and then decides whether the M sense points satisfy the predetermined condition to generate the decision result; when the decision result identifies that the M sense points satisfy the predetermined condition, it represents that the input operation is the input operation for changing the display content of the display screen, and then the switch instruction is generated; then the first object identification in the first region of the display screen is controlled to change to the N+1th object identification at the first moment in response to the switch instruction according to the parameter values of the M sense points; and the second region including the first region of the display screen is controlled to display the N+1th data content corresponding to the N+1th object identification one by one at the T+1 moment at last. Thus, efficiency of use can be improved, so as to improve the user experience In the several embodiments provided by this application, it is understood that the disclosed apparatus and method can be implemented by other means. For example, the above-described embodiment of the apparatus is only schematic, for example, the division of the units is only a logical functional division, and there can be other manners of division in the actual implementation, for example, a plurality of units or components can be combined or integrated into another system, or some features can be neglected or are not implemented. Further, coupling or direct coupling or communication connection between the respective constituent parts shown or discussed may be indirect coupling or communication connection through some interfaces, apparatus or units, and may be electrical, mechanical or other forms.

The above-described units explained as separate components may be, or may not be separated physically, and the components displayed as units may be, or may not be physical units. And they may be positioned at one place, or may be distributed to a plurality of network units. Object of the solution of the embodiment can be implemented by selecting some or all of the units according to actual requirement.

Further, all of the respective functional units in the respective embodiments of the present disclosure may be integrated into a the processing unit, or the respective units may be as a separate unit respectively, or two or more units may be integrated into one unit. The above-described integrated unit can be implemented by form of hardware, or may be implemented by form of hardware plus software functional unit.

Those skilled in the art can understand, all or a part of steps for implementing the above-described embodiment of method can be implemented by hardware related to the program instruction, and the aforementioned program may be stored in a computer readable storage medium, and the program executes steps including the above-described embodiment of method as being executed. And the aforementioned storage medium includes various media which can store program code such as a mobile storage apparatus, a read-only memory (ROM), a random access memory (RAM), a disc or an optical disk.

Or, if the above-described integrated unit of the present disclosure is implemented in form of software functional module and sold or used as independent product, it may also be stored in one computer readable storage medium. Based on such understanding, the technical solution of the embodiments of the present disclosure essentially or the part contributed to the related art can be embodied by a form of a software product, the computer software product is stored in a storage medium, which includes some instructions to cause a computer equipment (which may be a personal computer, a server or a network equipment or the like) to execute all or a part of the method in the respective embodiments of the present disclosure. And the above-described storage medium includes: various kinds of medium which can store program code such as a mobile storage apparatus, a ROM, a RAM, a disc or an optical disk or the like.

The above mentioned is only the detailed implementation of the present invention, but the range sought for protection of the present invention is not limited thereto, variation or replacement thought out by those skilled in the art easily in the technical range disclosed in the present invention should be covered within the range sought for protection by the present invention. Therefore, the protection range of the invention is defined by the protection range of the claim.

The invention claimed is:

1. An information processing method applied in an electronic apparatus, the method comprising:
acquiring M sense points for representing an input operation through a sensing device of the electronic apparatus, wherein M is an integer larger than or equal to 1;
deciding whether the M sense points satisfy a predetermined condition to generate a decision result;
representing that the input operation is an input operation for changing a display content of the display screen when the decision result identifies that the M sense points satisfy the predetermined condition, and generating a switch instruction;
controlling a first object identification in a first region of a display screen of the electronic apparatus to change to a N+1th object identification at a first moment in response to the switch instruction according to parameter values of the M sense points, wherein N is an integer larger than or equal to 1; and
controlling a second region of the display screen to display N+1th data content corresponding to the N+1th object identification one by one at a T+1th moment, wherein the second region comprises the first region, and T is an integer larger than or equal to 1, wherein the T+1th moment is after the first moment, and during a period from the first moment to the T+1th moment, the N+1th object identification is continuously displayed in the first region of the display screen while the N+1th data content corresponding to the N+1th object identification is not displayed in the second region of the display screen.

2. The method according to claim 1, wherein controlling the first object identification in the first region of the display screen to change to the N+1th object identification at the first moment in response to the switch instruction according to the parameter values of the M sense points comprises:
displaying n object identifications in order in the first region of the display screen when the parameter values of the M sense points are larger than a set threshold, wherein a last object identification in the n object identifications is the N+1th object identification, and n is an integer such that $2 \leq n \leq N$.

3. The method according to claim 1, wherein controlling the first object identification in the first region of the display screen to change to the N+1th object identification at the first moment in response to the switch instruction according to the parameter values of the M sense points comprises:
displaying a second object identification in the first region of the display screen when the parameter values are less than a set threshold, wherein, the second object identification is the N+1th object identification, and the second object identification is a next object identification of the first object identification.

4. The method according to claim 2, wherein the method further comprises at the time of displaying the n object identifications in order in the first region of the display screen, controlling a progress identification to be displayed in a third region of the display screen, and controlling the progress identification to change with the n object identifications in the first region changing in order; wherein the progress identification is for indicating a positional relationship/progress relationship of the object identification positioned in the first region currently with respect to a complete set of the object identifications.

5. The method according to claim 1, wherein
the electronic apparatus includes a frame body and a fixing device connected to the frame body for fixing the electronic apparatus on an operational body;
the frame body includes a functional main body including a display screen and a display module, and display principles of the display module and the display screen are different;
the display module comprises a display imaging unit, and a top end face of the frame body is made of a transparent material and the display screen is provided under the top end face;
the display screen corresponds to a first display output region on the top end face, and the display module corresponds to a second display output region on the top end face;
a first size of the display screen is consistent with a size of the first display output region, and a second size of the display imaging unit is less than a size of the second display output region;
a perceived size of a display content on the display screen is consistent with the first display output region when there is a first distance value between the electronic apparatus and an observer of the electronic apparatus, and a perceived size of a display content on the display imaging unit is larger than the size of the second display output region when there is a first distance value between the electronic apparatus and the observer of the electronic apparatus, wherein a light spot in the second display output region can be an effect displayed and outputted by the display module; when the user gets closer to the electronic apparatus, abundant content can be seen through the light spot of the second display output region, and the content observed by the user exceeds content that can be carried by physical magnitude of the second display output region; and
the method further comprising:
detecting whether there is the first distance value between the electronic apparatus and the observer to obtain a detection result;
enabling the display module when the detection result indicates that a the first distance value between the electronic apparatus and the observer exists;
displaying associated data content through the display module, wherein the associated data content is related to the object identification displayed on the display screen and/or the data content corresponding to the object identification.

6. An electronic apparatus including a display screen and a sensing device, wherein the electronic apparatus comprises a non-transitory computer readable storage medium, which when executed is configured to:
acquire M sense points for representing an input operation through the sensing device, wherein M is an integer larger than or equal to 1;
decide whether the M sense points satisfy a predetermined condition to generate a decision result;
represent that the input operation is an input operation for changing the display content of the display screen when the decision result identifies that the M sense points satisfy the predetermined condition, and to generate a switch instruction;
control a first object identification in a first region of the display screen to change to a N+1th object identification at a first moment in response to the switch instruction according to parameter values of the M sense points, wherein N is an integer larger than or equal to 1; and
control a second region of the display screen to display N+1th data content corresponding to the N+1th object identification one by one at a T+1th moment, wherein the second region comprises the first region, and T is an integer larger than or equal to 1, wherein the T+1th moment is after the first moment, and during a period from the first moment to the T+1th moment, the N+1th object identification is continuously displayed in the first region of the display screen while the N+1th data content corresponding to the N+1th object identification is not displayed in the second region of the display screen.

7. The electronic apparatus according to claim 6, wherein, the non-transitory computer readable storage medium is further configured to trigger a first controller when it determines that the parameter values are larger than a set threshold; and the first controller is configured to control to display n object identifications in order in the first region of the display screen, wherein, a last object identification in the n object identifications is the N+1th object identification, and n is an integer such that 2≤n≤N.

8. The electronic apparatus according to claim 6, wherein, the non-transitory computer readable storage medium is further configured to trigger a second controller when it determines that the parameter values are less than a set threshold; and the second controller is configured to control to display a second object identification in the first region of the display screen, wherein, the second object identification is the N+1th object identification, and the second object identification is a next object identification of the first object identification.

9. The electronic apparatus according to claim 7, wherein, the non-transitory computer readable storage medium is further configured to control to display a progress identification in a third region of the display screen and control to change the progress identification with the n object identifications in the first region changing in order at the time of controlling to display n object identifications in order in the first region of the display screen; wherein, the progress identification is for indicating a positional relationship/progress relationship of the object identification positioned in the first region currently with respect to a complete set of the object identifications.

10. The electronic apparatus according to claim 6, wherein, the electronic apparatus includes a frame body and a fixing device connected to the frame body for fixing the electronic apparatus on an operational body;
the frame body includes a functional main body including a display screen and a display module, and display principles of the display module and the display screen are different;

the display module includes a display imaging unit, a top end face of the frame body is made of a transparent material, and the display screen is provided under the top end face;

the display screen corresponds to a first display output region on the top end face, and the display module corresponds to a second display output region on the top end face;

a first size of the display screen is consistent with a size of the first display output region, and a second size of the display imaging unit is less than a size of the second display output region;

a perceived size of a display content on the display screen is consistent with the first display output region when there is a first distance value between the electronic apparatus and an observer of the electronic apparatus, and a perceived size of a display content on the display imaging unit is larger than the size of the second display output region when there is a first distance value between the electronic apparatus and the observer of the electronic apparatus, wherein a light spot in the second display output region can be an effect displayed and outputted by the display module; when the user gets closer to the electronic apparatus, abundant content can be seen through the light spot of the second display output region, and the content observed by the user exceeds content that can be carried by physical magnitude of the second display output region;

the non-transitory computer readable storage medium further configured to:

detect whether the first distance value between the electronic apparatus and the observer to obtain a detection result exists;

enable the display module when the detection result represents that there is the first distance value between the electronic apparatus and the observer; and display associated data content through the display module, the associated data content is related to the object identification displayed on the display screen and/or the data content corresponding to the object identification.

* * * * *